United States Patent
Kunihiro

(10) Patent No.: US 7,242,942 B2
(45) Date of Patent: Jul. 10, 2007

(54) COMMUNICATION SYSTEM, APPARATUS AND METHOD FOR CONTROLLING COMMUNICATION, APPARATUS AND METHOD FOR COMMUNICATION, AND COMPUTER PROGRAM

(75) Inventor: Takushi Kunihiro, Tokyo (JP)

(73) Assignee: Sony Corporation (JP)

( * ) Notice: Subject to any disclaimer, the term of this patent is extended or adjusted under 35 U.S.C. 154(b) by 675 days.

(21) Appl. No.: 10/414,666

(22) Filed: Apr. 16, 2003

(65) Prior Publication Data
US 2004/0029602 A1 Feb. 12, 2004

(30) Foreign Application Priority Data
Apr. 25, 2002 (JP) .......................... P2002-123532

(51) Int. Cl.
H04Q 7/20 (2006.01)
H04B 7/00 (2006.01)
(52) U.S. Cl. ...................... 455/444; 455/500
(58) Field of Classification Search ................ 455/422, 455/428, 435.1, 437, 442, 444, 500, 560, 455/422.1
See application file for complete search history.

(56) References Cited

U.S. PATENT DOCUMENTS

| | | | | |
|---|---|---|---|---|
| 5,574,968 A | * | 11/1996 | Olds et al. ................ | 455/428 |
| 5,581,596 A | * | 12/1996 | Hogan ..................... | 455/435.1 |
| 5,909,469 A | * | 6/1999 | Frodigh et al. ............. | 375/302 |
| 6,108,547 A | * | 8/2000 | Yamashita et al. .......... | 455/442 |
| 6,359,869 B1 | * | 3/2002 | Sonetaka ................... | 370/337 |
| 6,370,379 B1 | * | 4/2002 | Rugaard .................. | 455/435.1 |
| 6,985,736 B1 | * | 1/2006 | Aalto ........................ | 455/447 |
| 2002/0090948 A1 | * | 7/2002 | Nagata ....................... | 455/437 |
| 2003/0040306 A1 | * | 2/2003 | Kentaro et al. ............. | 455/422 |
| 2003/0125029 A1 | * | 7/2003 | Han ........................... | 455/444 |

FOREIGN PATENT DOCUMENTS

| | | |
|---|---|---|
| JP | 08-037535 | 2/1996 |
| JP | 08-097821 | 4/1996 |
| JP | 11-177622 | 7/1999 |
| JP | 2001-237875 | 8/2001 |

* cited by examiner

Primary Examiner—Benny Q. Tieu
(74) Attorney, Agent, or Firm—Lerner, David, Littenberg, Krumholz & Mentlik, LLP

(57) ABSTRACT

Communication system, apparatus and method for delivering user data from a mobile terminal without the mediation of base station control stations. Each base station is provided with intra cell links for data communication with mobile terminals present in the specified cell wherein communication can be conducted and inter base station links for data communication with adjacent base stations. When a base station receives user data from an adjacent base station, the base station sends the user data to a mobile terminal as destined if the mobile terminal is present inside the cell of the base station, and resends the user data to adjacent base stations using the inter base station links if the mobile terminal is present outside of the cell of the base station.

30 Claims, 17 Drawing Sheets

COMMUNICATION SYSTEM, APPARATUS AND METHOD FOR CONTROLLING COMMUNICATION, APPARATUS AND METHOD FOR COMMUNICATION, AND COMPUTER PROGRAM

BACKGROUND OF THE INVENTION

1. Field of the Invention

The present invention relates to a communication system for, for example, transmitting data by air, an apparatus and a method for controlling communications, an apparatus and a method for communications, and a computer program and more particularly to a communication system, an apparatus and a method for controlling communications, an apparatus and a method for communications, and a computer program wherein data transmission is made between mobile terminals through the mediation of base stations which provide cells wherein communication can be conducted.

In further details, the present invention relates to a communication system, an apparatus and a method for communications, an apparatus and a method for communications, and a computer program wherein the cells of a plurality of base stations are deployed in plane to implement wider communication ranges and more particularly to a communication system, an apparatus and a method for controlling communications, an apparatus and a method for communications, and a computer program wherein data transmission is made between mobile terminals without tree-structuring base stations or establishing base station control stations which control a plurality of base stations to manage information on routes in a centralized manner.

2. Description of Related Art

Mobile communication arises from the discovery of electromagnetic waves and has been researched and developed to meet the necessity for communication with ships, airplanes, and trains. The targets to which communication is conducted have been expanded to automobiles and humans. In addition to communications by telegraph and by telephone, computer data and multimedia contents including images have been transmittable.

Owing to the recent advances of manufacturing technology and the like, mobile terminals have been rapidly reduced in size and lowered in price. Further, because of the improvement of information and communication services and the like, mobile terminals have been personalized as seen in the example of cellular phones. Moreover, liberalization of the telecommunications sector, reduction in communication charges, and other factors have increasingly expanded the tiers of users.

Mobile communication is basically such that a mobile terminal, such as car telephone or cellular phone, finds the nearest base station and communicates radio waves between the mobile terminal and the base station. The communication range that a radio wave from one base station can reach is referred to as "cell." A cell is usually a circle with a specified radius, whose center is located at a base station antenna. Base stations are installed at certain special intervals to deploy a plurality of cells provided by the base stations in plane, and a wide service area is thereby built.

The reason why mobile communication systems use cells is the advantages derived therefrom, including that the reach of radio waves from a base station is limited to within the cell thereof and thereby the same frequencies can be repeatedly used by other cells and the limited frequency resources can be effectively used, and that a service area is compartmentalized into cells and thereby the transmission power for communications is reduced for shrinking the size of and saving the power of mobile units which are usually packaged as battery-driven portable devices. With increase in the number of cellular phone users and the like, the size of cells has been increasingly reduced.

FIG. 1 schematically illustrates the configuration of base stations in an existing cellular radio communication system, such as PDC (Personal Digital Cellular) and GSM (Global System for Mobile Communication). Base stations are in general connected in tree structure, and, as shown in the figure, the communication system comprises base stations which are scattered here and there and manage their own cells; base station control stations which control a plurality of base stations in respective areas; mobile communication switching centers which implement switching between a plurality of base station control stations; and core networks which connect together remote mobile communication switching centers.

In such a tree-structured base station configuration, control of routing between base stations is facilitated because each station located at a branch point of the tree manages information on routes indicating how control data and user data destined for mobile terminals should be delivered.

More specifically, a base station in the undermost layer, in response to a request to send occurs in the cell, makes transfer in the cell if the target of the transmission is found in the same cell, and transfers the request to send to the base station control station at the immediately upper level if the target is not found. Similarly, the base station control station completes the request to send in its own range of control if the target of the transmission is found in the range of control, and transfers the request to send to the mobile communication switching center at the next upper level if the target of the transmission is not found. The mobile communication switching center transfers the request to send to another mobile communication switching center through a core network if the target of the transmission is not found in the coverage of the switching center. Therefore, transmitted data from a mobile terminal is delivered to the destination through base station control stations which control a plurality of base stations, or through mobile communication switching centers.

Consideration will be given to a case where transmission is made from a mobile terminal 1-1 to another mobile terminal 1-5, for example. A base station control station 1-6 holds information indicating that the mobile terminal 1-5 is camping in the cell of a base station 1-4, and as a result, data from a base station 1-2 is delivered to the mobile terminal 1-5 as the target of the transmission through the base station control station 1-6 and the base station 1-4.

The above-mentioned tree-structured configuration of base stations is suitable for large-scale radio communication systems, such as cellular radio communication systems, but not for small-scale radio communication systems comprising cells called micro-cells and pico-cells.

One of the reasons for the unsuitability is that base stations need be connected with one another using wires and installation work for wired connection line (approach line) and the maintenance and management thereof impose heavy burden on communication common carriers. In the micro-cell or pico-cell environment, the condition of propagation of radio waves from base stations largely fluctuates due to surrounding buildings and the like, and the arrangement and configuration of base stations need be changed on a case-by-case basis to cope with this. Another reason for the unsuitability is that the above-mentioned tree-structured configuration cannot flexibly cope with this change.

High load is applied to control stations located at branch points of the tree, and, to add a new base station, the information on the base station need be stored in the control station in advance. Thus, it is difficult to easily install a new base station.

SUMMARY OF THE INVENTION

The present invention is made with the above-mentioned technical problems taken into account, and an object of the present invention is to provide excellent communication system, apparatus and method for controlling communications, apparatus and method for communications, and computer program wherein the cells of a plurality of base stations are deployed in plane and wider communication ranges are implemented.

Another object of the present invention is to provide excellent communication system, apparatus and method for controlling communications, apparatus and method for communications, and computer program wherein preferable data transmission is made astride cells between mobile terminals without imposing excessive processing load on base stations.

Another object of the present invention is to provide excellent communication system, apparatus and method for controlling communications, apparatus and method for communications, and computer program wherein transmitted data is delivered from one mobile terminal to another without installing a base station control station which control a plurality of base stations to manage information on routes in a centralized manner.

Another object of the present invention is to provide excellent communication system, apparatus and method for controlling communications, apparatus and method for communications, and computer program wherein communication ranges can be expanded one after another by easily installing an additional base station.

The present invention is made with the above problems taken into account. The first aspect of the present invention is a communication system comprising a plurality of base stations and a plurality of mobile terminals, wherein each base station is provided with intra cell links for data communication with mobile terminals present in the cell of the base station itself; and inter base station links for data communication with adjacent base stations. The inter base station link may be radio link or wired link.

However, "system" described here refers to a logical aggregate of a plurality of devices (or functional modules which perform specific functions), irrespective of whether each device or functional module is placed in a single enclosure or not.

When each base station receives user data destined for a mobile terminal in the cell thereof from a mobile terminal in the cell thereof, the base station sends the user data to the mobile terminal as destination. When the base station receives user data destined for a mobile terminal out of the cell thereof, the base station transfers the user data to adjacent base stations through the above-mentioned inter base station links. Also, in case the base station receives user data from an adjacent base station, the base station sends the user data to a mobile terminal as destination if the user data is destined for the mobile terminal in the cell thereof. The base station transfers the user data to adjacent base stations using the above-mentioned inter base station links if the user data is destined for a mobile terminal out of the cell thereof.

Sine an inter base station radio link is handled as if it were a broadcast signal, user data transferred by a base station is received by adjacent base stations. By repeating such transfer of user data, the user data sent out from a mobile terminal is eventually delivered to a base station which controls the mobile terminal as destination, as well. When the base station detects that the mobile terminal as destination is present in the cell of the base station itself, the base station delivers the user data using an ordinary base station-to-mobile terminal radio link.

In the communication system according to the first aspect of the present invention, transmitted data can be delivered from one mobile terminal to another without connecting a plurality of base stations in tree structure or establishing base station control stations which control a plurality of base stations to manage information on routes in a centralized manner.

In the communication system according to the first aspect of the present invention, each base station only has to perform the operation of transferring user data to adjacent base stations if the user data is not destined for a mobile terminal in the cell of the base station itself. As a result, data transmission is made astride cells between mobile terminals without imposing excessive processing load on base stations.

In the communication system according to the first aspect of the present invention, communication ranges can be expanded by easily installing additional base stations.

The second aspect of the present invention is an apparatus for controlling communications which operates as base station in an environment created by deploying the cells of a plurality of base stations in plane and a method therefor, comprising:

an intra cell communicating means or step wherein data communication with a mobile terminal present in the cell of the base station concerned is conducted through an intra cell communication link;

an inter base station communicating means or step wherein data communication with adjacent base stations is conducted through inter base station communication links; and a data transmission controlling means or step, wherein in response to user data received through the above-mentioned intra communication link or the above-mentioned inter base station communication links, the user data is transferred using the above-mentioned intra cell communicating means or step or the above-mentioned inter base station communicating means or step.

The above-mentioned data transmission controlling means or step may be so constituted that, when user data destined for a mobile terminal in the cell of the base station concerned is received, the user data is sent to the mobile terminal as destination, and, when user data destined for a mobile terminal out of the cell is received, the user data is transferred to adjacent base stations using the above-mentioned inter base station links.

In base stations to which the second aspect of the present invention is applied, an inter base station link is handled as if it were a broadcast signal, and user data transferred through the inter base station communicating means or step is received by adjacent base stations. Therefore, user data sent out from a mobile terminal in a cell is eventually delivered to a base station which controls a mobile terminal as destination by repetitively transferring the user data at each base station. When a base station detects that the mobile terminal as destination is present in the cell of the base station itself, the base station can deliver the user data using a base station-to-mobile terminal communication channel through the intra cell communicating means or step.

Therefore, by deploying in plane the cells of base stations to which the second aspect of the present invention is applied, transmitted data can be delivered from one mobile terminal to another without connecting a plurality of the base stations in tree structure or establishing base station control stations which control a plurality of base stations to manage information on routes in a centralized manner.

In this case, each base station only has to perform the operation of transferring user data to adjacent base stations if the user data is not destined for a mobile terminal in the cell of the base station itself. As a result, data transmission can be made astride cells between mobile terminals without imposing excessive processing load on base stations. Further, since information on routes is not managed in a centralized manner, communication ranges can be easily expanded by installing one after another additional base stations to which the second aspect of the present invention is applied.

If base stations transfer user data through inter base station communication links with the same timing, a situation that the same user data is simultaneously transferred to a base station from a plurality of adjacent base stations and the base station cannot receive the data occurs. To cope with this, the above-mentioned data transmission controlling means or step may exercise such control that, if user data destined for a mobile terminal present out of the cell concerned is received, transfer of the user data to adjacent base stations is started when a random time has passed after the reception of the user data and thereby data transferred from a plurality of base stations is prevented from simultaneously arriving.

An inter base station radio link is handled as if it were a broadcast signal. When such resending is unlimitedly repeated, unnecessary data transmission, including repetitive resending of the same user data to a base station, is made, which leads to wasteful use of communication bands or increase in communication load.

To cope with this, communication control equipment which functions as base station may be provided with cache data and be so constituted that the same user data is not repetitively resent for a certain time period (for a time period before a cache timer expires) for the prevention of wasteful use of communication bands and increase in communication load.

In this case, a mobile terminals as origin of transmission of user data is caused to add a user data identifier to user data, for example. Meanwhile, with respect to each base station, the above-mentioned data transmission controlling means or step is so constituted that, when user data is received through an intra cell communication link or inter base station communication link, the user data identifier contained in the user data is held in cache, and that, if user data having the same user data identifier as cached is received, the user data is not transferred to adjacent base stations.

Alternatively, a maximum number of times of transfer which indicates what number of times a base station should resend user data when the base station receives the user data from a sending mobile terminal maybe specified to prevent the same user data from being repetitively resent for the prevention of wasteful use of communication bands and increase in communication load. In this case, each base station can be constituted that the above-mentioned data transmission controlling means or step does not transfer to adjacent base stations user data whose number of times of transfer has reached the maximum number of times of transfer.

Further, sending mobile terminals may be so constituted that, if a mobile terminal fails to send user data, the mobile terminal sends the user data again. In this case, when a base station receives user data, the base station resends the data without fail as long as the base station is in such a state that the base station should perform resending (the user data is not in cache and the maximum number of times of transfer has not been reached). Since the user data is concentrically delivered, there is a danger that communications traffic between base stations increases at the periphery of the circle.

To cope with this, the header of user data is provided with a present number of times of resending which indicates what number of times the present sending is, in addition to a maximum number of times of transfer, to limit resending of user data. For example, with respect to each base station, the data transmission controlling means or step is so constituted that, if a present number of times of resending is equal to or above a threshold, resending is performed with a probability of less than 1 (in other words, there is a case where resending is not performed).

This makes it possible to prevent increase in communications traffic between base stations. Further, loss of user data can be prevented by taking appropriate values for threshold and the probability of resending.

In ordinary applications, such as low-speed mobile communications and communications with fixed networks, a delivery route is often valid for a certain time period once a user datagram has managed to arrive at a fixed network or mobile terminal as destination. In this case, unnecessary traffic between base stations can be avoided by informing the sending mobile terminal of a delivery route made valid.

With respect to each base station that receives user data, the above-mentioned data transmission controlling means adds a device identifier to the user data before transferring the data to adjacent base stations. Thus, when the user data arrives at the mobile terminal as destination, information on delivery route with the described device identifiers of the base stations on the delivery route is generated.

When user data with the delivery route thereof established is transferred, the above-mentioned data transmission controlling means or step transfers the user data if the device identifier of the device concerned is contained in the user data and discards the user data if not. By this delivering procedure, base stations which relay user data resend data by an established route but do not search a new route, and thus increase in traffic of user data resent between base stations can be suppressed.

The third aspect of the present invention is a computer program written in computer-readable form so as to exercise on a computer system communication control for base stations to operate in a communication environment created by deploying the cells of a plurality of the base stations in plane, the computer program comprising:

an intra cell communicating step in which data communication with a mobile terminal present in the own cell is conducted through an intra cell communication link;

an inter base station communicating step in which data communication with adjacent base stations is conducted through inter base station communication links; and a data transmission controlling step in which, in response to received user data, transfer of the user data using the above-mentioned intra cell communication link or inter base station communication links is controlled.

The computer program according to the third aspect of the present invention is a computer program described in computer-readable form so that specified processing is performed on the computer system. In other words, by installing the computer program according to the third aspect of the present invention on the computer system, synergistic action is produced on the computer system, and the same effect as in the apparatus and the method for controlling radio communications according to the first aspect of the present invention is achieved.

Other and further objects, features, and advantages of the present invention will be apparent from the embodiments of the present invention described below and the more detailed description in connection with the accompanying drawings.

DETAILED DESCRIPTION OF THE PREFERRED EMBODIMENTS

Figure 1:
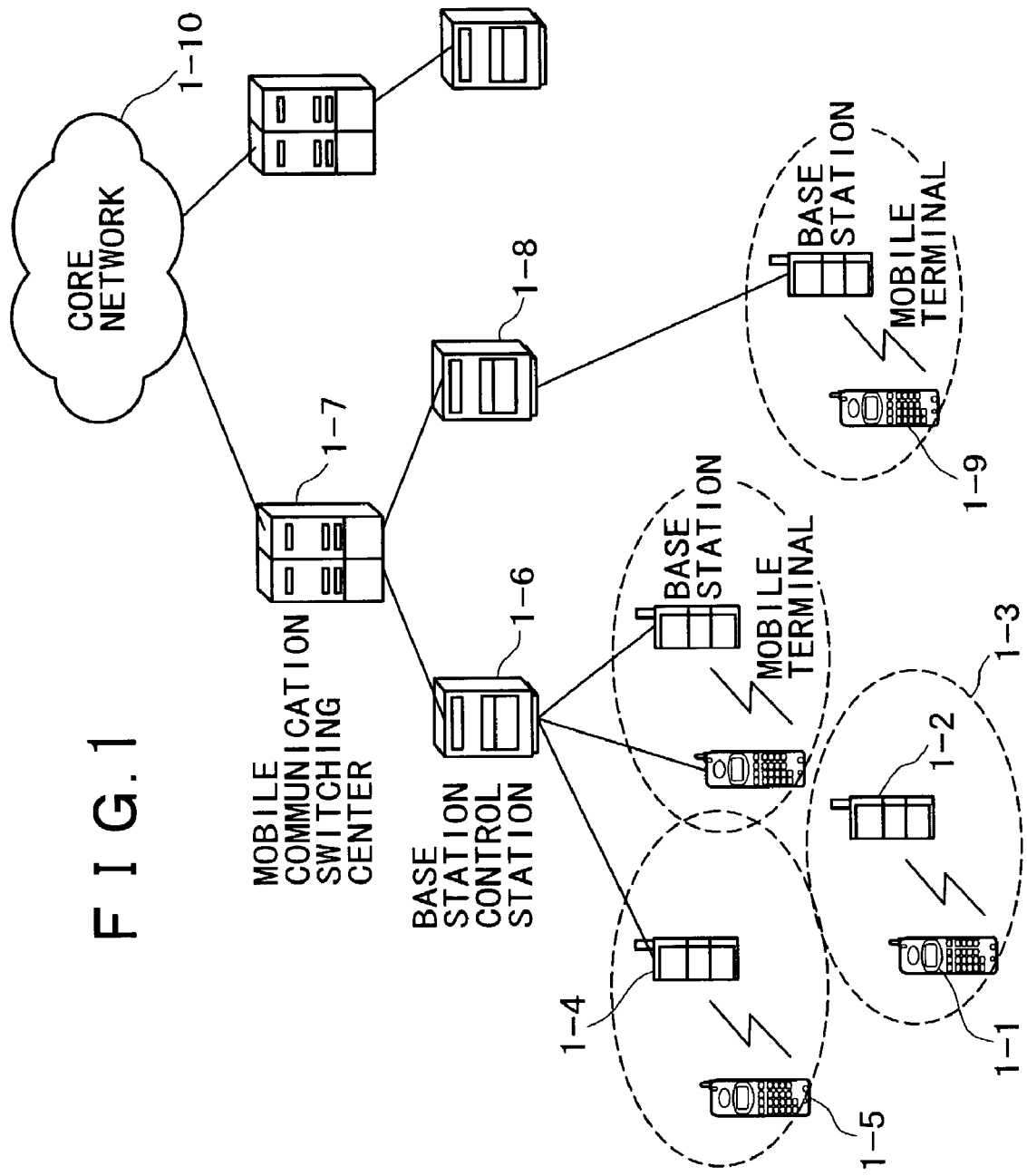
FIG. 1 is a drawing schematically illustrating the configuration of base stations in an existing cellular radio communication system.

Referring to the drawings, embodiments of the present invention will be described in details.

Figure 2:
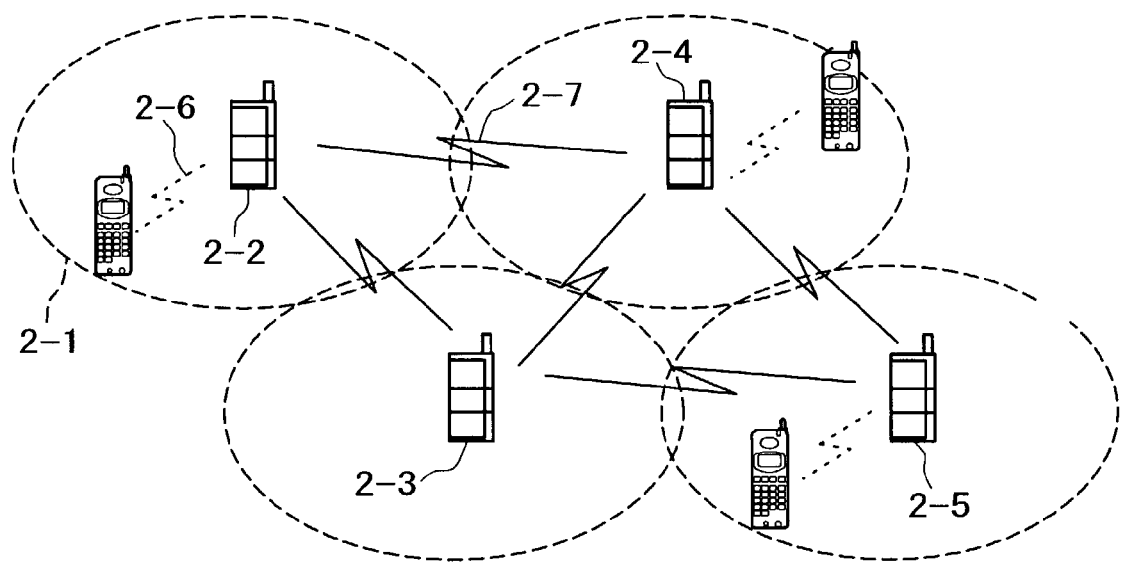
FIG. 2 is a drawing schematically illustrating the constitution of a radio communication system in an embodiment of the present invention.

FIG. 2 schematically illustrates the constitution of a radio communication system in one embodiment of the present invention. In the example shown in the figure, radio communication areas are formed by deploying in plane the cells of four base stations 2-2, 2-3, 2-4, 2-5. However, the subject matter of the present invention is not confined by the number of cells.

A mobile terminal 2-1 and a base station 2-2 communicate with each other using a radio link 2-6. Base stations communicate with one another using another radio link 2-7. Since a radio link is used in communications between base stations, signals sent from a base station 2-3 can be received by any of a plurality of nearby base stations 2-2, 2-4, and 2-5 (as long as the base station is located at a distance at which the signal can be received). In other words, communications between base stations may be all handled as broadcast communication.

In this case, the radio link 2-7 is shared among a plurality of base stations. Radio link resources must therefore be multiplexed for a plurality of the base stations. Possible methods for multiplexing include CDMA (Code Division Multiple Access) and TDMA (Tim Division Multiple Access). However, the methods for multiplexing themselves are not directly related to the subject matter of the present invention.

In the example shown in the figure, there is no relation of connection of tree structure or the like, wired or wireless, between the base stations. Each base station ranks equally with the other base stations and there is not such a device as base station control station that controls a plurality of base stations and manages information on routes between cells.

Figure 3:
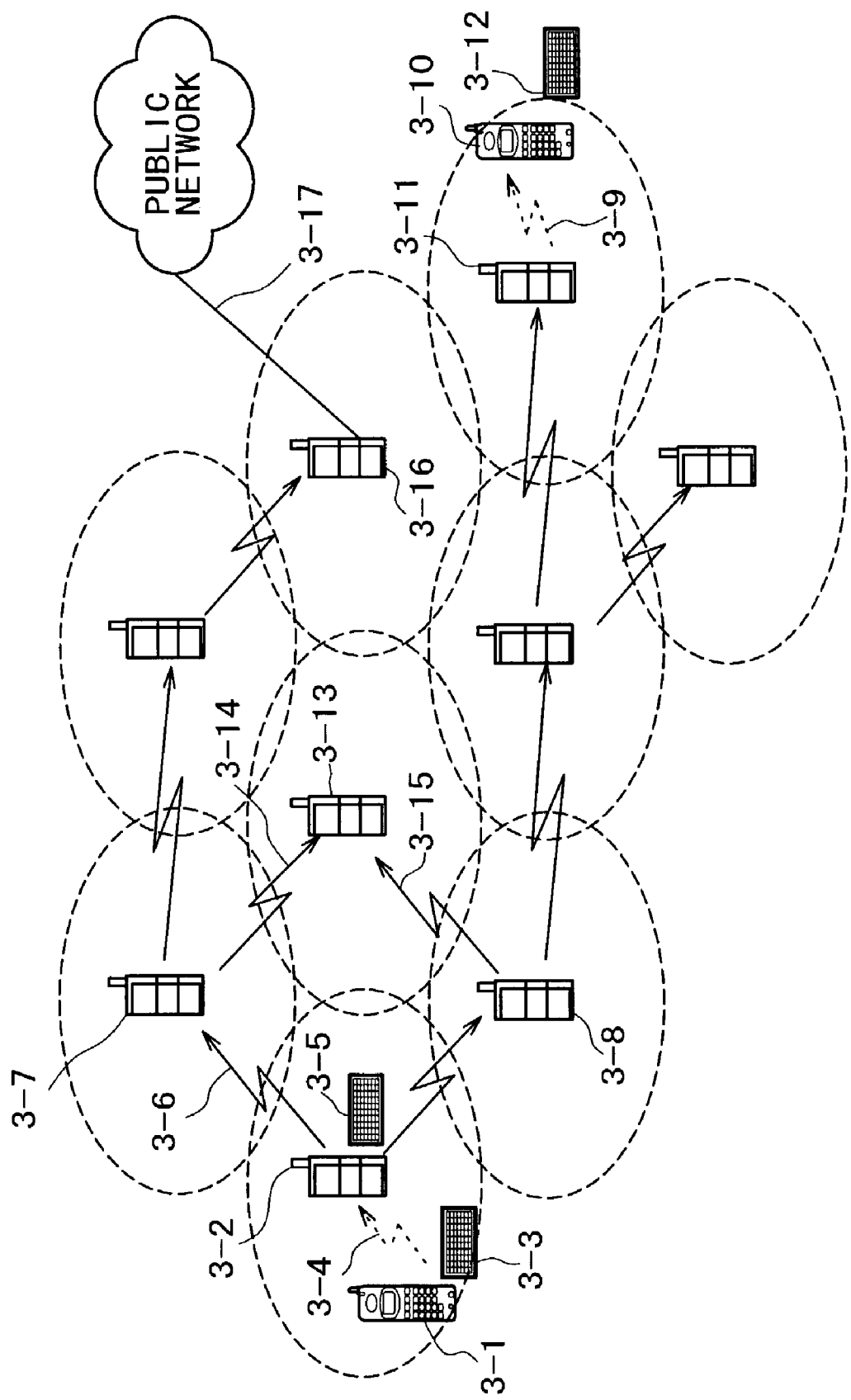
FIG. 3 is a drawing schematically illustrating the way delivery is made between base stations.

FIG. 3 schematically illustrates the way data transmission is made astride cells between mobile terminals, that is, delivery is made among base stations, in a radio communication system in this embodiment. However, the example shown in the figure illustrates the way user data 3-3 sent from a mobile terminal 3-1 is delivered to a mobile terminal 3-10 as destination.

The mobile terminal 3-1 sends the user data 3-3 to a base station 3-2 through a radio link 3-4. The bas station 3-2 resends the user data 3-5 which underwent reception processing to nearby base stations through an inter base station radio link 3-6.

In this specification, this processing is referred to as "resend" for the sake of convenience. This term does not denote ordinary resend (after failure in communication) in communication protocols but is used to mean "forwarding" or "(repetitively) transferring" user data identical in content. Each base station is capable of performing the above-mentioned resending processing without having any information on routes.

Since an inter base station radio rink is handled as if it were a broadcast signal (as mentioned above), the user data resent by the base station 3-2 is received both by a nearby base station 3-7 and by a nearby base station 3-8.

The user data 3-3 sent out from the base station 3-1 is delivered in the end to a base station 3-11 as well. Since the base station 3-11 is capable of detecting that the mobile terminal as destination is present in the cell of the base station itself, the base station transmits the user data 3-12 to the mobile terminal 3-10 using a base station-to-mobile terminal radio link 3-9.

By the above-mentioned processing procedure, the user data 3-3 from the mobile terminal 3-1 can be delivered in the end to the mobile terminal 3-10 without exercising any special route control.

In the radio communication system illustrated in FIG. 3, communication between base stations is conducted through radio links. The same effect of the present invention is naturally produced even if connection between base stations is provided by a wired network, instead of radio links.

Figure 4:
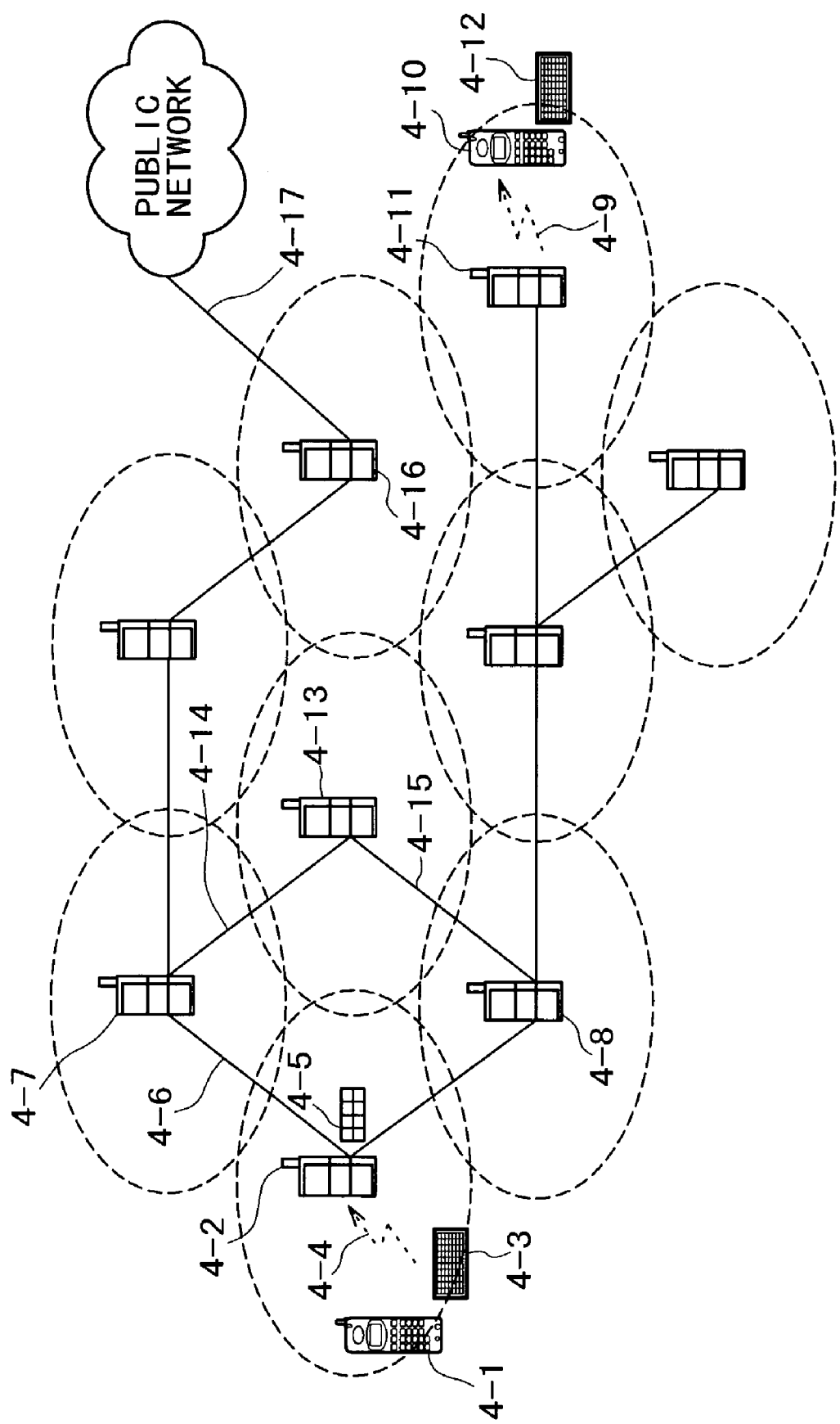
FIG. 4 is a drawing schematically illustrating the constitution of a radio communication system wherein base stations are connected with one another through a wired network.

FIG. 4 schematically illustrates the constitution of a radio communication system wherein base stations are connected with one another through a wired network. However, in the embodiment illustrated in this figure as well, each base station ranks equally with the other base stations and there is not such a device as base station control station that controls a plurality of base stations and manages information on routes between cells, as in the case illustrated in FIG. 3.

Here, consideration will be given to a case where user data 4-3 sent from a mobile terminal 4-1 is delivered to a mobile terminal 4-10 as destination.

The mobile terminal 4-1 sends the user data 4-3 to a base station 4-2 through a radio link 4-4. The base station 4-2 resends the user data 4-5 which underwent reception processing to nearby base stations through inter base station wired links 4-6. The base station 4-2 is capable of performing the above-mentioned resending processing without having any information on routes.

The base station 4-2 is connected with adjacent base station 4-7 and base station 4-8 through wired links. When the base station 4-2 resends the user data to adjacent base stations, the base station may resend the data in succession or in a broadcast manner. In any case, the user data is resent to the adjacent base stations.

The user data 4-3 sent out from the mobile terminal 4-1 is delivered in the end to abase station 4-11 by repeating the above-mentioned resending. Since the base station 4-11 is capable of detecting that the mobile terminal as destination is present in the cell of the base station itself, the base station transmits the user data 4-12 to the mobile terminal 4-10 using a base station-to-mobile terminal radio link 4-9.

By the above-mentioned processing procedure, the user data 4-3 from the mobile terminal 4-1 can be delivered in the end to the mobile terminal 4-10 without exercising any special route control.

An inter base station radio link is handled as if it were a broadcast signal. In such a communication environment that a plurality of base station cells adjoin one another, there is a possibility that the same user data arrives from a plurality of adjacent base stations at some base station in the process of each base station's repeating resending of the user data, as illustrated in FIGS. 3 and 4. For example, in the example illustrated in FIG. 3, the same user data arrives at the base station 3-13 both from the base station 3-7 and from the base station 3-8 through the inter base station radio links 3-14 and 3-15, respectively.

If radio communications of the same frequency take place with the same timing at this time, the base station 3-13 may receive neither the data through radio link 3-14 nor the data through the radio link 3-15, depending on the method for radio multiplexing. To avoid this, a base station resending user data waits to transmit by a random time after the base station receives user data, and then resends the data. Thus, simultaneous transmission from a plurality of base stations can be avoided.

In the above-mentioned method, a random time is taken as wait time before resending. Alternately, a time uniquely generated from a base station identifier may be taken as the wait time, and as the result of this, simultaneous transmission can be avoided without fail. For example, a time interval obtained by multiplying the low 6 bits of a base station identifier by a certain time can be taken as wait time before resending.

Figure 5:
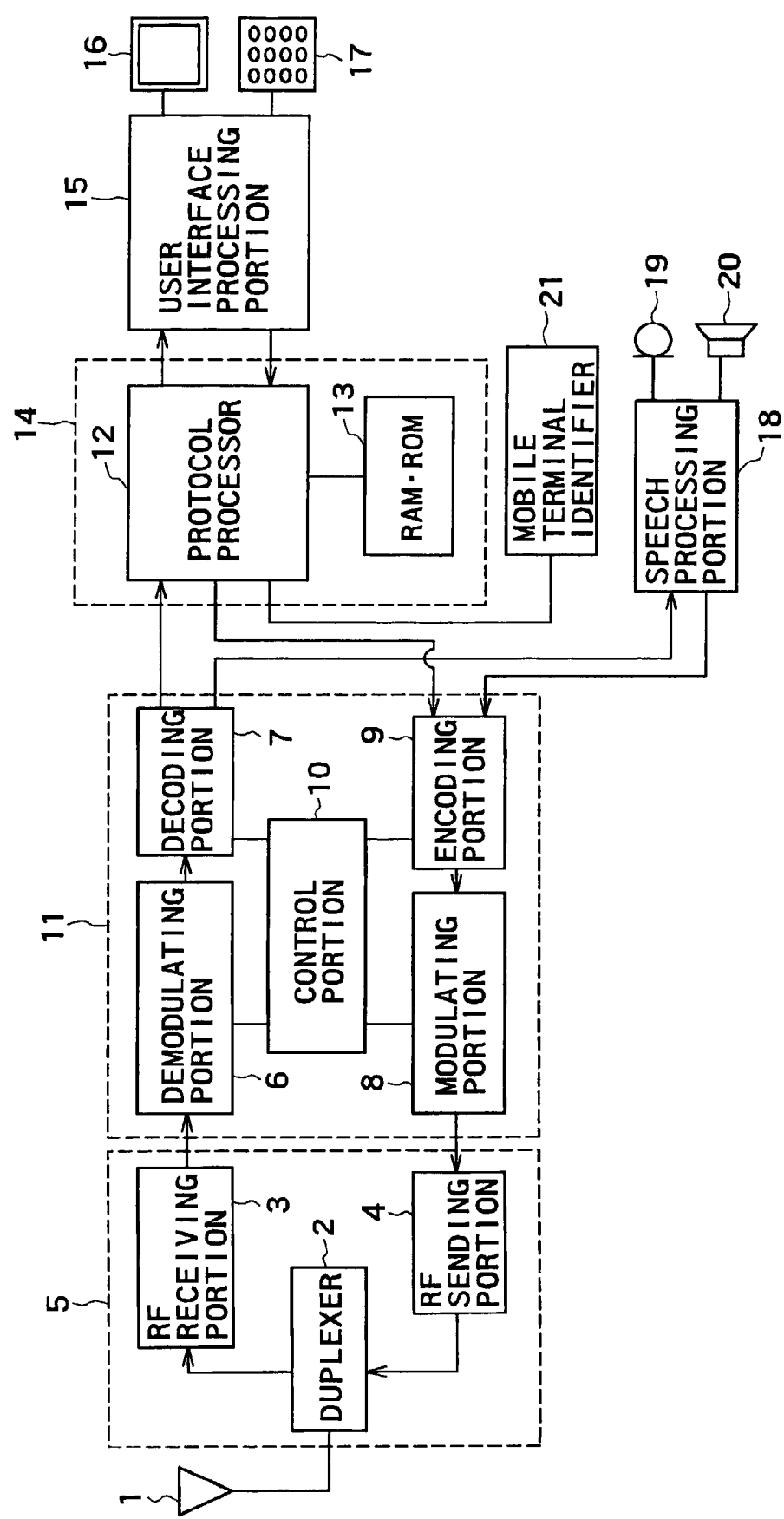
FIG. 5 is a drawing schematically illustrating the constitution of radio communication apparatus which operates as mobile terminal in the radio communication system in the embodiments of the present invention.

FIG. 5 schematically illustrates the constitution of radio communication apparatus which operates as mobile terminal in the radio communication system in this embodiment.

Reference number 1 represents an antenna. The antenna 1 is connected with an RF receiving portion 3 and an RF sending portion 4 through an antenna duplexer 2. A functional module encircled with a line marked with reference number 5 is composed of analog circuits.

A signal received at the antenna 1 is sent to the RF receiving portion 3 through the duplexer 2 and down-converted there, and further converted into a digital signal by A-D conversion and sent to a subsequent signal processing portion 11. On the other hand, a transmitted signal from the signal processing portion 11 is converted into an analog signal by D-A conversion and further up-converted into an RF signal by the RF sending portion 4, and is then sent to the antenna 1 through the antenna duplexer 2.

The signal processing portion 11 consists of a demodulating portion 6 and a decoding portion 7 for demodulating and decoding baseband received signals and an encoding portion 9 and a modulating portion 8 for encoding and modulating baseband transmitted signals. For these functions, an appropriate modulation method or encoding method is selected by a control portion 10.

The block indicated by reference number 14 is a protocol processing portion. The protocol processing portion 14 consists of a protocol processor 12 and memory 13 for storing execution programs for the processor 12 and temporarily storing working data.

The protocol processing portion 14 is connected with a user interface processing portion 15. The user interface processing portion 15 is connected with user output devices, such as display unit (display) 16, and user input devices 17, such as keyboard and keypad, and can interact with users.

The signal processing portion 11 is connected directly with a speech processing portion 18 and in some cases, aural signals are sent and received by air without protocol processing. The speech processing portion 18 is connected with audio input devices 19, such as microphone, and audio output devices 20, such as speaker.

A unique terminal identifier is allocated to a mobile terminal and is stored in a nonvolatile storage indicated by reference number 21.

Figure 6:
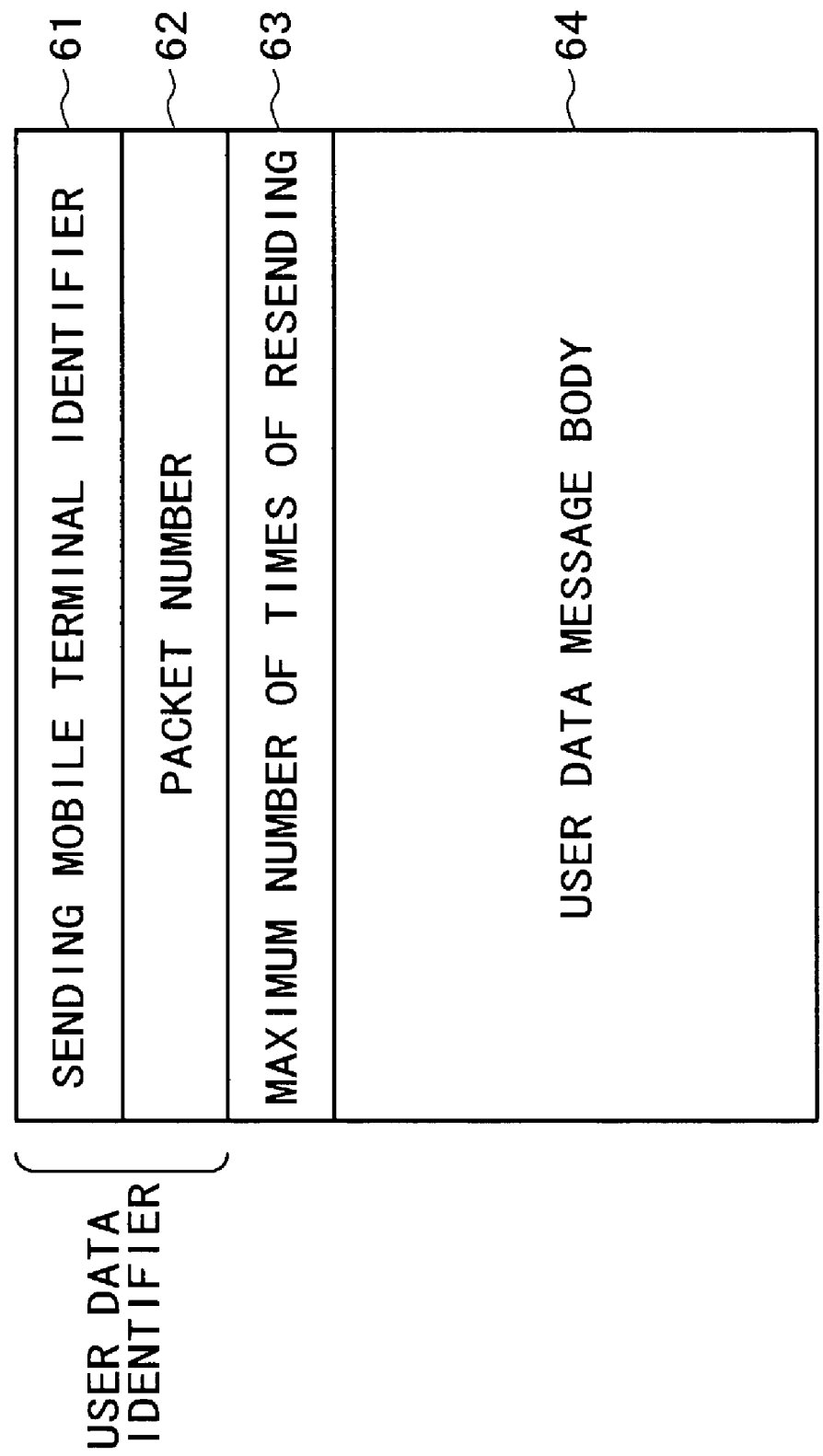
FIG. 6 is a drawing illustrating the format of user data sent out from mobile terminals.

FIG. 6 illustrates the format of user data sent out from a mobile terminal.

When a mobile terminal sends user data to a base station, the mobile terminal prefixes as header information a sending mobile terminal identifier 61 and a packet number 62 to the message body (payload) of the user data 64.

The sending mobile terminal identifier 61 is unique identifiers allocated to mobile terminals. The packet number 62 is numbers allocated in sequence to packets sent by mobile terminals. The number of bits allocated as packet number 62 is finite and the packet number itself takes cyclic values. For example, if 16 bits are allocated to packet number, the packet number takes 0, 1, 2, 3, . . . , 65535, 0, 1, . . .

However, combinations of a mobile terminal identifier 61 and a packet number 62 can be made unique within a certain time by taking as cache expiration time, described later, a value smaller than a time before a packet number is repeated. In this embodiment, the identifier obtained by this combination is referred to as "user data identifier."

In addition to this user data identifier, the header information has a maximum number of times of resending 63 which indicates "how many times user data should be resent by a base station which receives the same user data."

Figure 7:
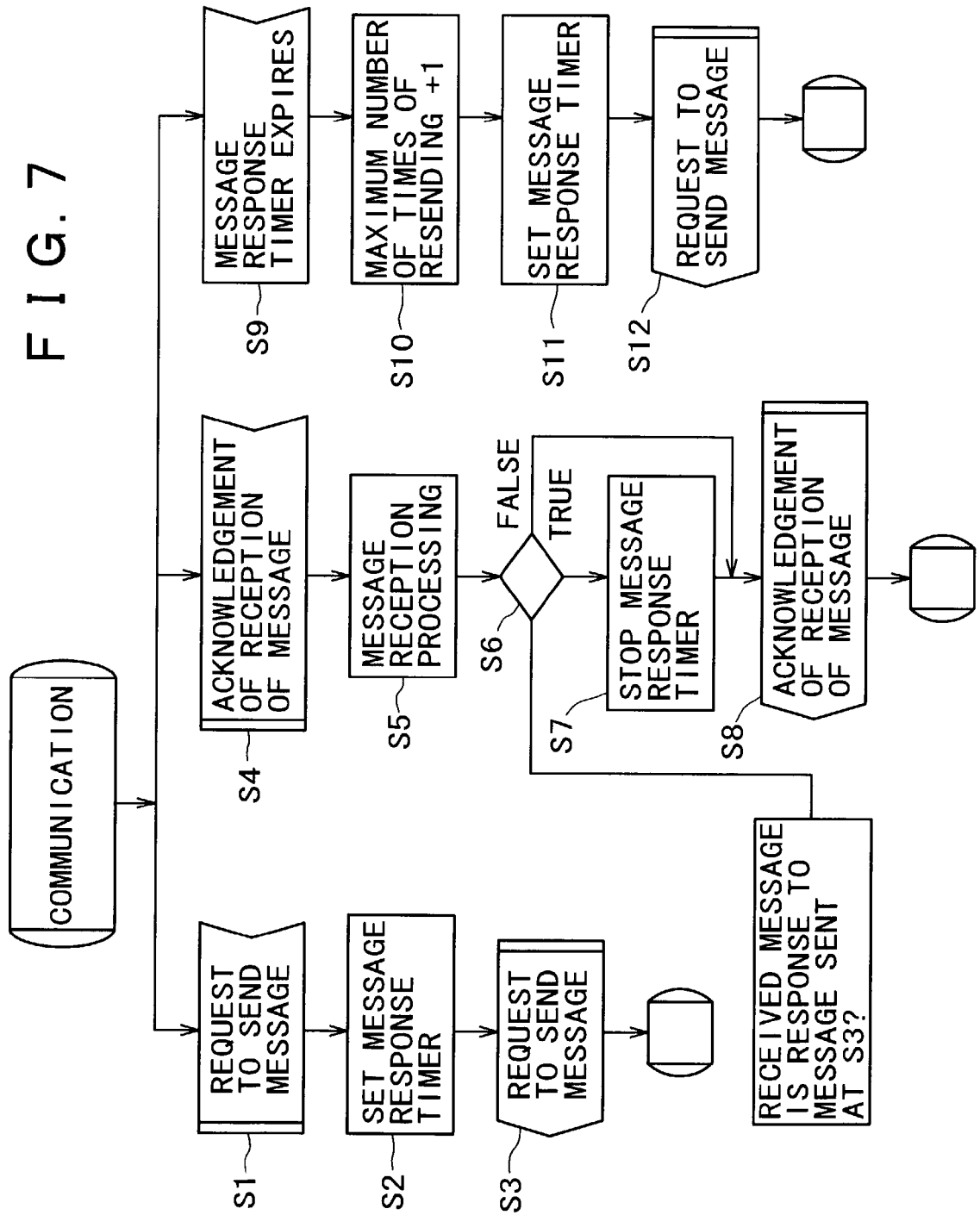
FIG. 7 is a drawing illustrating a processing procedure for a mobile terminal to perform communicating operation, in the form of flowchart.

FIG. 7 illustrates the processing procedure for a mobile terminal to perform communicating operation, in the form of flowchart.

When a mobile terminal makes a request to send a message (Step S1), the mobile terminal sets a message response timer first (Step S2) and then makes the request to send the message, that is, sends user data, to a base station with which the position of the mobile terminal is registered (Step S3).

Meanwhile, when the mobile terminal receives an acknowledgement of message reception (Step S4), the mobile terminal performs message reception processing (Step S5) and then judges whether the received message is a response to the message the mobile terminal itself sent at Step S3 (Step S6). If the received message is a response to the transmitted message, the mobile terminal stops the message response timer at this point of time (Step S7). Then, the mobile terminal acknowledges the reception of the message (Step S8).

If the message response timer expires (Step S9), the mobile terminal judges that the message has not arrived at the destination and increases the maximum number of times of resending by one (Step S10). Then, the mobile terminal sets the message response timer again (Step S11) and sends out the same message (Step S12).

Figure 8:
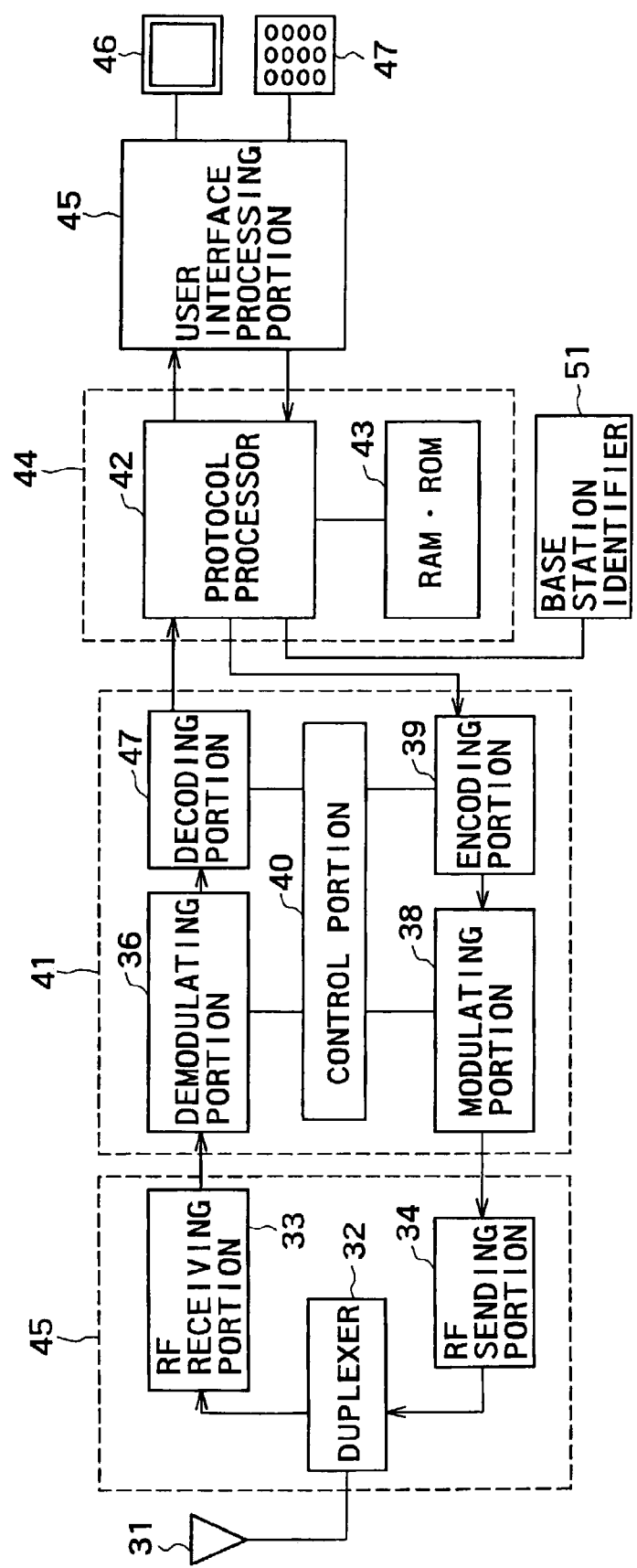
FIG. 8 is a drawing schematically illustrating the constitution of radio communication apparatus which operates as base station in the radio communication system in the embodiments of the present invention.

FIG. 8 schematically illustrates the constitution of radio communication apparatus which operates as base station in the radio communication system in this embodiment.

An antenna 31 is connected with an RF receiving portion 33 and an RF sending portion 34 through an antenna duplexer 32. A functional module encircled with a line marked with reference number 45 is composed of analog circuits.

A signal received at the antenna 31 is sent to the RF receiving portion 33 through the duplexer 32 and down-converted there, and further converted into a digital signal by A-D conversion and sent to a subsequent signal processing portion 41. On the other hand, a transmitted signal from the signal processing portion 41 is converted into an analog signal by D-A conversion and further up-converted into an RF signal by the RF sending portion 34, and is then sent to the antenna 31 through the antenna duplexer 32.

The signal processing portion 41 consists of a demodulating portion 36 and a decoding portion 37 for demodulating and decoding baseband received signals and an en encoding portion 39 and a modulating portion 38 for encoding and modulating baseband transmitted signals. For these functions, an appropriate modulation method or encoding method is selected by a control portion 40.

A protocol processing portion 44 consists of a protocol processor 42 and memory 43 for storing execution programs for the processor 42 and temporarily storing working data.

The protocol processing portion 44 is connected with a user interface processing portion 45. The user interface processing portion 45 is connected with user output devices, such as display unit (display) 46, and user input devices 47, such as keyboard and keypad, and can interact with users.

A unique terminal identifier is allocated to a base station and is stored in a nonvolatile storage indicated by reference number 51.

Figure 9:
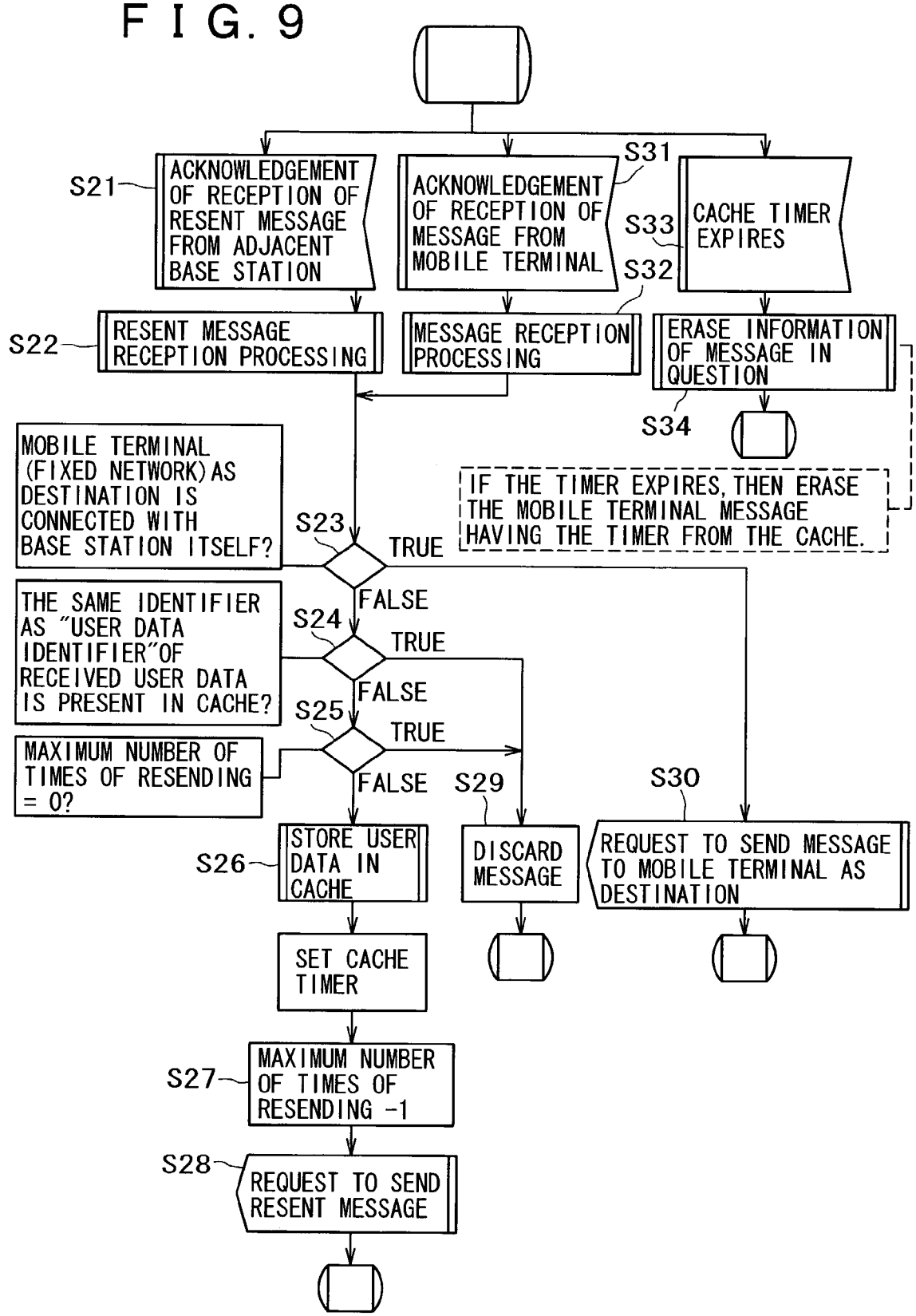
FIG. 9 is a flowchart illustrating a processing procedure for a base station to operate in the radio communication system in the embodiments of the present invention.
Figure 10:
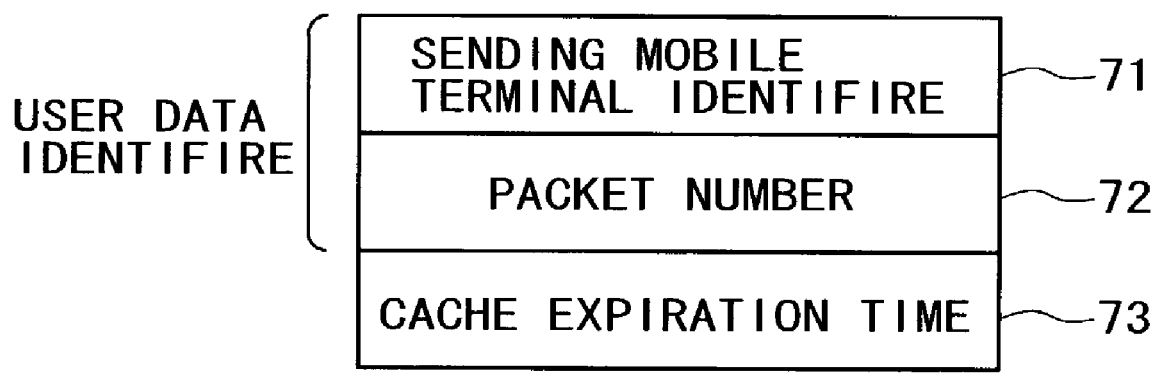
FIG. 10 is a drawing illustrating the format of cache data held in base stations.

FIG. 9 illustrates the processing procedure for a base station to operate in a radio communication system in this embodiment, in the form of flowchart. FIG. 10 illustrates the format of cache data held in a base station.

When a base station receives a resent message from an adjacent base station (Step S21), the base station performs reception processing (e.g. demodulation and decoding) on the message (Step S22) and then extracts the destination from the user message body 64 of the message.

Then, the base station judges whether the destination of the received message is a mobile terminal connected with the base station itself or whether the destination is a fixed network connected with the base station itself (Step S23). If the result of the judgment is affirmative, the base station delivers the message to the mobile terminal as destination (Step S30) and terminates the entire routine of the processing.

Meanwhile, if the destination is not a mobile terminal or fixed network connected with the base station itself, the base station searches the cache to judge whether the same message has been already received (Step S24). As illustrated in FIG. 10, in the cache, user data identifiers consisting of a sending mobile terminal identifier 71 and a packet number 72 and a cache expiration time 73 indicating a time before the cache data should be discarded are stored.

If the user data identifier of received user data is present in the cache, the base station judges that the base station has already resent the same user data and discards the received user data (Step S29), and terminates the entire routine of the processing.

If the user data identifier is not present in the cache, the base station further checks the maximum number of times of resending in the user data (Step S25) and judges whether to resend (deliver) the user data to adjacent base stations. Where the maximum number of times of resending is zero, the base station discards the received user data (Step S29) and terminates the entire routine of the processing.

Where the maximum number of times of resending is not zero, the base station performs resending processing on the same data. In this case, the base station stores the information of the received user data in the cache (refer to FIG. 10) (Step S26) and set the cache timer. Subsequently, the base station decreases the maximum number of times of resending in the user data by one (Step S27) and then resends the user data to adjacent base stations through inter base station radio links (Step S28).

By the above-mentioned procedure, user data can be made to arrive at a destination (mobile terminal or fixed network) within an appropriate range of propagation.

Above is the description of the procedure for delivering user data between base stations. This is the same with processing performed where first user data is received from a mobile terminal (Step S31). In this case, after the base station performs reception processing as at Step S22 (Step S32), the base station judges whether the destination is a mobile terminal connected with the base station itself or whether the destination is a fixed network connected with the base station itself. If so, the base station performs delivery processing. If not, the base station performs resending processing using inter base station links (same as above).

When the cache timer expires (Step S33), the base station erases the mobile terminal message having the timer from the cache (refer to FIG. 10) (Step S34).

A inter base station radio link is handled as if it were a broadcast signal (as mentioned above). When such resending is unlimitedly repeated, unnecessary data transmission, including repetitive resending of the same user data to a base station, is made, which leads to wasteful use of communication bands or increase in communication load. To cope with this, in this embodiment, each base station is provided with cache data as illustrated in FIG. 10 and is prevented from repetitively resending the same user data for a certain time period (for a time period before the cache timer expires) to avoid wasteful use of communication bands and increase in communication load.

Figure 11:
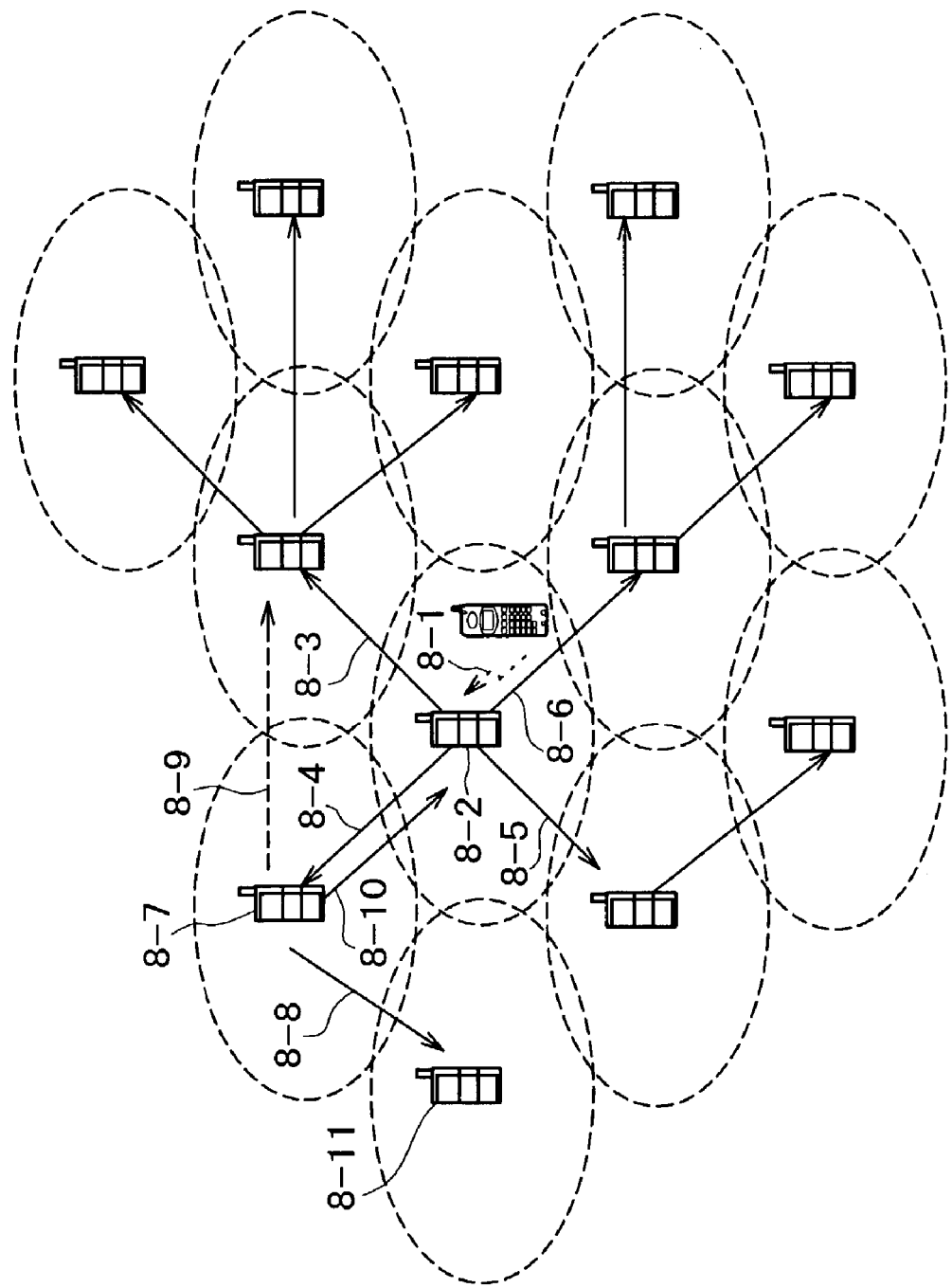
FIG. 11 is a drawing illustrating the processing of delivering user data to avoid overlaps.

FIG. 11 illustrates a mechanism of delivery processing of user data wherein a base station does not deliver once received user data again, that is, repetition is avoided.

A base station 8-2 which received user data sent by a mobile terminal 8-1 resends the user data to adjacent base stations using inter base station links 8-3, 8-4, 8-5, and 8-6.

A base station 8-7 which received the resent data similarly resends the user data to adjacent base stations. At this time, resending from the base station 8-7 to a base station 8-11 succeeds because the base station 8-11 has not received the same user data yet. Meanwhile, when the base station 8-2 receives the user data, the base station 8-2 discards the data because the base station 8-2 has already received the same data.

As mentioned above, user data can be delivered without causing congestions in inter base station links by resending of the user data. As a result, the user data is delivered concentrically from the sending base station located at the center and substantially in one direction.

To perform the above-mentioned cache processing, a cache for indicating whether user data has been already received is required. Meanwhile, the packet number takes finite values and a mechanism to clear the cache in a certain time is required.

The processing of clearing a cache is implemented by the operation wherein, in response to the expiration of a cache timer, the mobile terminal message having the timer is erased from the cache at Steps S33 through S34 in the flowchart shown in FIG. 9. Thus, the bloating of cache memory is suppressed.

In the delivering procedure illustrated in FIG. 9, user data sent from a mobile terminal can arrive at the destination thereof where the destination is present within the range the data can reach in the maximum number of times of resending; however, the user data cannot arrive at the destination where the destination is present beyond the range the data can reach in the maximum number of times of resending. To cope with this, if a response (Acknowledge) is not returned from the destination (mobile terminal or fixed network) within a certain time, the mobile terminal may be caused to judge that the destination is present out of the range the data can reach in the maximum number of times of resending and to increase the maximum number of times of resending described in the header of the user data by one and then resend the user data. As a result, a mobile terminal can make user data arrive at a desired destination by resending from the mobile terminal even if the destination is present out of the range the data can reach in the maximum number of times of resending.

While a mobile terminal performs the above-mentioned resending of user data, base stations which receive the user data resend the data without fail as long as the base stations are in such a state that the base stations should perform resending (the user data is not in cache and the maximum number of times of resending has not been reached). Since the user data is concentrically delivered (refer to FIG. 11), there is a danger that communications traffic between base stations increases at the periphery of the circle.

To cope with this, in this embodiment, the header of user data is provided with a present number of times of resending which indicates what number of times the present sending is, in addition to a maximum number of times of resending, to limit resending of user data. For example, if a present number of times of resending is equal to or above a threshold, resending is performed with a probability of less than 1 (in other words, there is a case where resending is not performed).

This makes it possible to prevent increase in communications traffic between base stations. Further, loss of user data can be prevented by taking appropriate values for threshold and the probability of resending.

Figure 12:
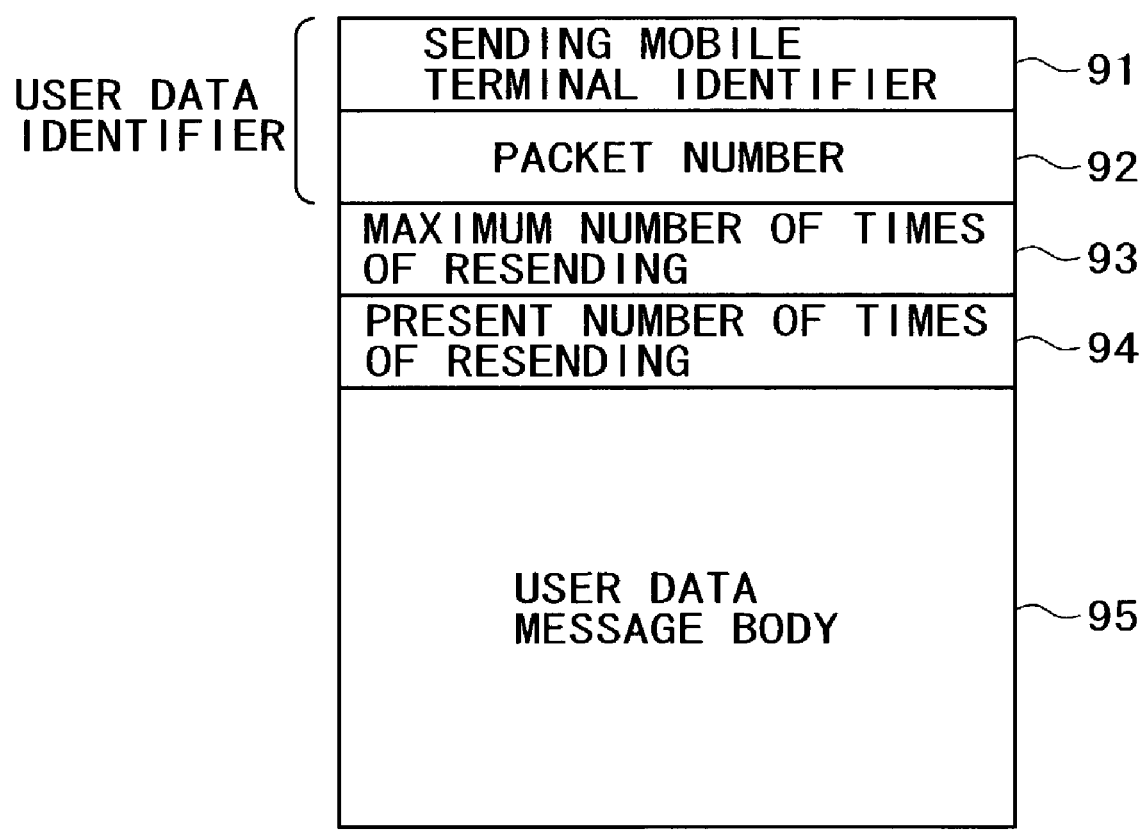
FIG. 12 is a drawing illustrating the format of user data including a present number of times of resending in addition to a maximum number of times of resending.

FIG. 12 illustrates the format of user data including present number of times of resending in addition to maximum number of times of resending. With use of this format, communication load on the radio communication system can be mitigated by limiting the resending of user data according to the present number of times of resending.

By the above-mentioned delivering procedure for user data, data can be delivered astride a plurality of cells between mobile terminals without tree-structuring base stations or establishing base station control stations to manage information on routes in a centralized manner. However, delivery routes must be searched each time a mobile terminal sends user data.

This is valid for such systems that mobile terminals frequently move between cells. Meanwhile, in ordinary applications, such as low-speed mobile communications and communications with fixed networks, a delivery route is often valid for a certain time period once a user datagram has managed to arrive at a fixed network or mobile terminal as destination.

In case of the latter, unnecessary traffic between base stations can be avoided by informing the sending mobile terminal of a delivery route made valid. A delivering procedure for keeping a once established delivery route valid for a certain time period for reuse thereof will be described below.

Like mobile terminals, base stations are provided with a unique base station identifier. (Refer to FIG. 8.) As illustrated in FIG. 13, user data is provided with fields in which route establishment identifier and relaying base station identifier are written, for tracing back once used delivery routes. In the description below, consideration will be given to a case where user data is delivered from a mobile terminal 3-1 to a mobile terminal 3-10 in the radio communication system illustrated in FIG. 3.

Figure 13B:
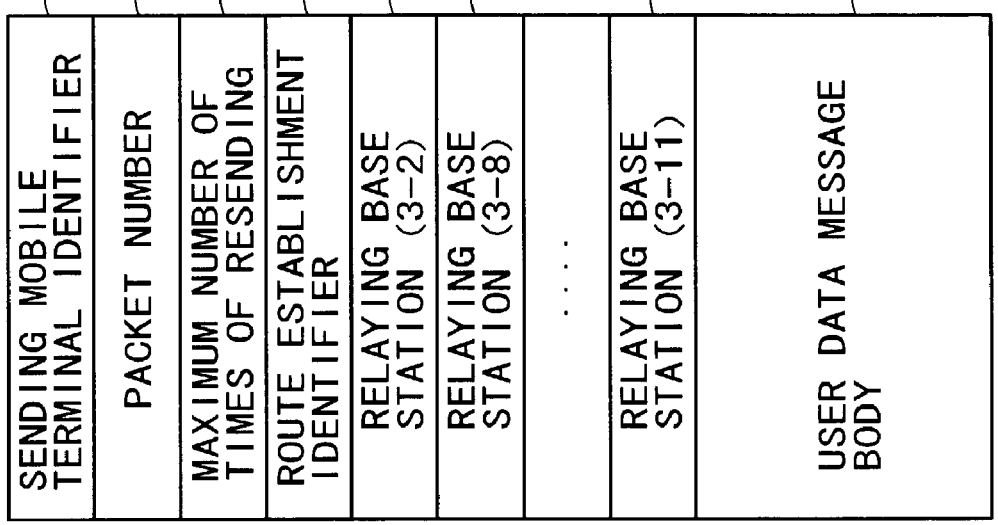
FIG. 13B is a drawing illustrating an example of the format of user data for implementing a function of tracing back delivery routes.
Figure 13A:
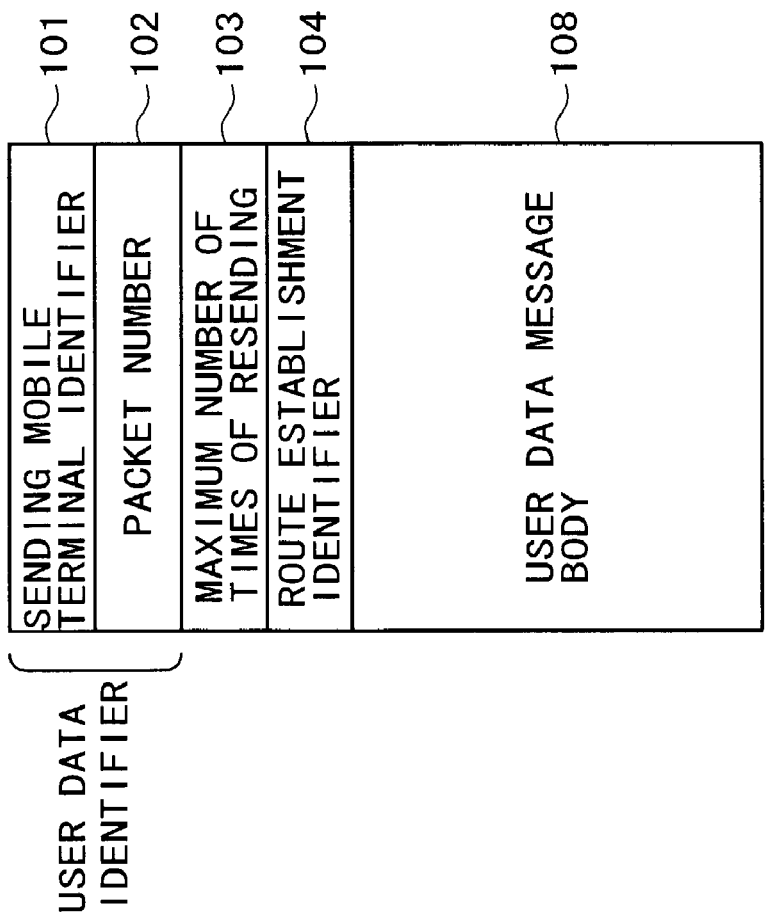
FIG. 13A is a drawing illustrating an example of the format of user data for implementing a function of tracing back delivery routes.

As illustrated in FIG. 13A, the sending mobile terminal 3-1 adds a route establishment identifier to user data before sending the data. Here, the route establishment identifier 104 indicates "route unestablished."

Base stations which relay this user data (e.g. base stations 3-2 and 3-8) add in succession own base station identifiers to the user data. When the user data eventually arrives at the base station 3-11 with which the mobile terminal 3-10 as destination is connected, a list of the base station identifiers of the base stations which relayed the user data has been generated in the user data, as illustrated in FIG. 13B.

When the base station with which the fixed network or mobile terminal as destination is connected receives the user data, the base station traces back, that is, sends in reverse the list of the base stations which relayed the data as user data, to the sending mobile terminal 3-1. This procedure for relaying data is the same as the procedure for relaying from the mobile terminal 3-1 to the mobile terminal 3-10.

When the mobile terminal 3-1 which received the base station list subsequently sends user data to the mobile terminal 3-10, the mobile terminal 3-1 uses the format illustrated in 13B. Here, the route establishment identifier 104 indicates "route established." When a base station receives the user data with the route establishment identifier indicating "route established," the base station judges whether its own base station identifier is included in the relaying base station list. If the identifier is included, the base station resends the user data. If not, the base station discards the user data.

By the above-mentioned delivering procedure, base stations which relay user data resend the data by an established route and do not search a new route. Therefore, traffic of user data resent between base stations is prevented from increasing.

Figure 14:
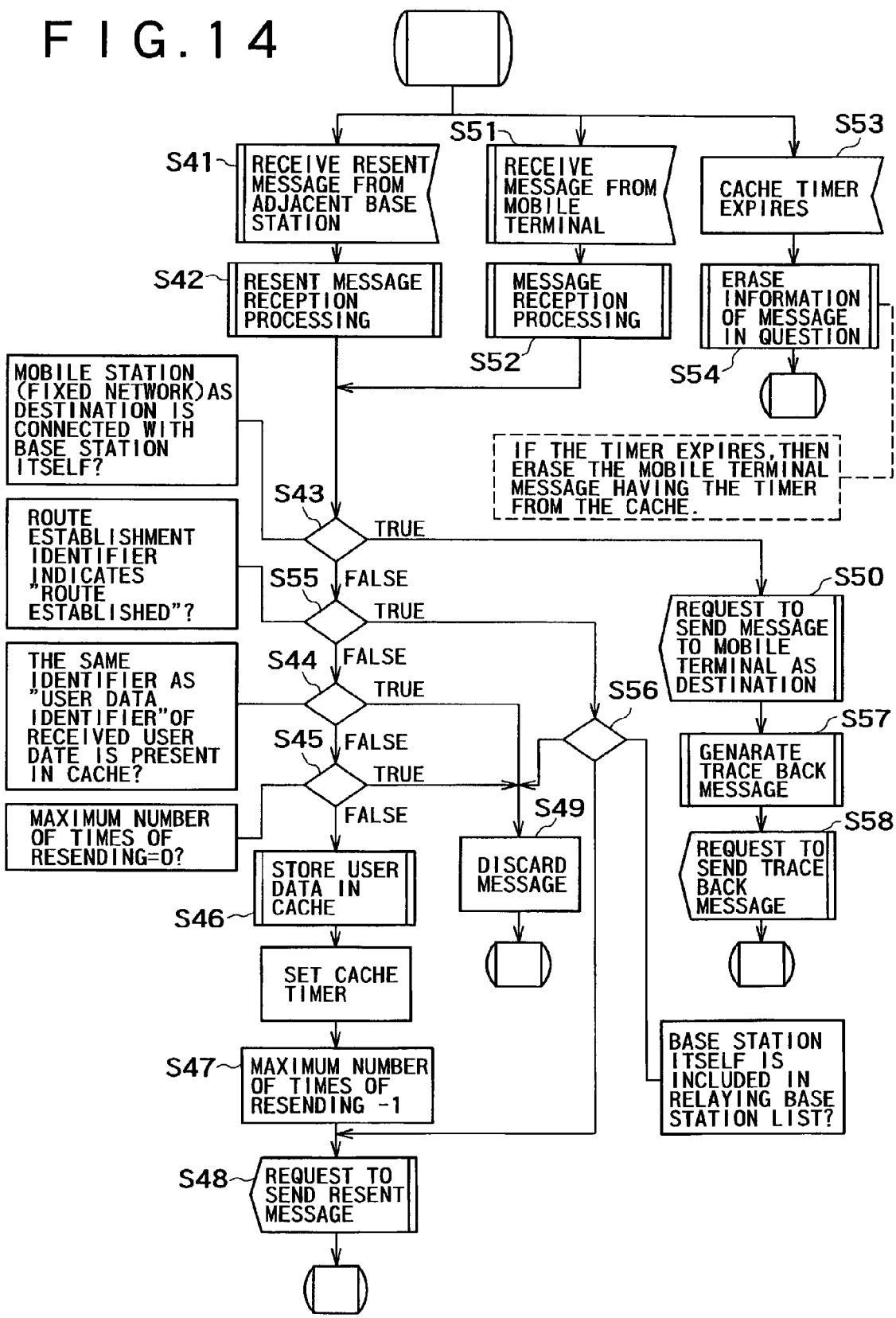
FIG. 14 is a flowchart illustrating the operating procedure for a base station provided with a route trace back function.

FIG. 14 illustrates the operating procedure for the base station provided with a function of tracing back routes, in the form of flowchart.

When the base station receives a resent message from an adjacent base station (Step S41), the base station performs message reception processing (e.g. demodulation, decoding) (Step S42), and then extracts the destination from the user message body 108 of the message.

Then, the base station judges whether the mobile terminal or fixed network as destination contained in the information on route is that connected with the base station itself (Step S43). If the fixed network or mobile terminal as destination is connected with the base station itself, the base station transmits a message requesting to send to the mobile terminal as destination (Step S50). Further, the base station generates a message to trace back the information on route (Step S57), and make to the sending mobile terminal a request to send message by trace back (Step S58). The request to send the message traced back is delivered to the sending mobile terminal by the same ordinary procedure as for resending user data.

If the fixed network or mobile terminal as destination contained in the information on route is not connected with the base station itself, the base station judges whether the state of the route establishment identifier in user data is "route established" (Step S55). If the identifier indicates "route established," the base station checks the user data (refer to FIG. 13B) to further judges whether the base station itself is contained in the relaying base station list (Step S56). If the base station itself is contained in the relaying base station list, the base station resends the message to adjacent base stations. If not, the base station discards the message (Step S49), and terminates the entire routine of the processing. As the result of the discard of the message, the message is not resent by other routes than established, and thus increase in unnecessary traffic is suppressed in the radio communication system.

If the route establishment identifier indicates "route unestablished" at Step S55, then the base station checks whether the same identifier as the user data identifier in the received user data is present in the cache, that is, the same message has been already received (Step S44).

If the user data identifier of the received user data is present in the cache, the base station judges that the base station has already resent the user data and discards the received user data (Step S49), and terminates the entire routine of the processing.

If the user data identifier is not present in the cache, the base station further checks the maximum number of times of resending in the user data (Step S45) to judge whether to resend (deliver) the user data to adjacent base stations. If the maximum number of times of resending is zero at this time, the base station discards the received user data (Step S49), and terminates the entire routine of the processing.

If the maximum number of times of resending is not zero, the base station performs the processing of resending the user data. In this case, the base station stores the information of the received user data in the cache first (refer to FIG. 10) (Step S46), and sets the cache timer. Subsequently, the base station reduces the value of maximum number of times of resending in the user data by one (Step S47), and then resends the user data to adjacent base stations using inter base station communication links (Step S48).

By the above-mentioned procedure, user data can be made to arrive at a destination (mobile terminal or fixed network) within an appropriate range of propagation with unnecessary resending of the message suppressed, using inter base station links.

Above is the description of the procedure for delivering user data between base stations. This is the same as for the processing performed when the initial user data is received from a mobile terminal (Step S51). In this case, the base station performs reception processing, as at Step S22, (Step S52), and then judges whether the destination is a mobile terminal or fixed network connected with the base station itself. If the destination is a mobile terminal or fixed network connected with the base station itself, the base station performs delivery processing. If not, the base station performs resending processing using inter base station links. (same as above)

If the cache timer expires (Step S53), the base station erases the mobile terminal message having the timer from the cache (refer to FIG. 10) (Step S54).

Figure 15:
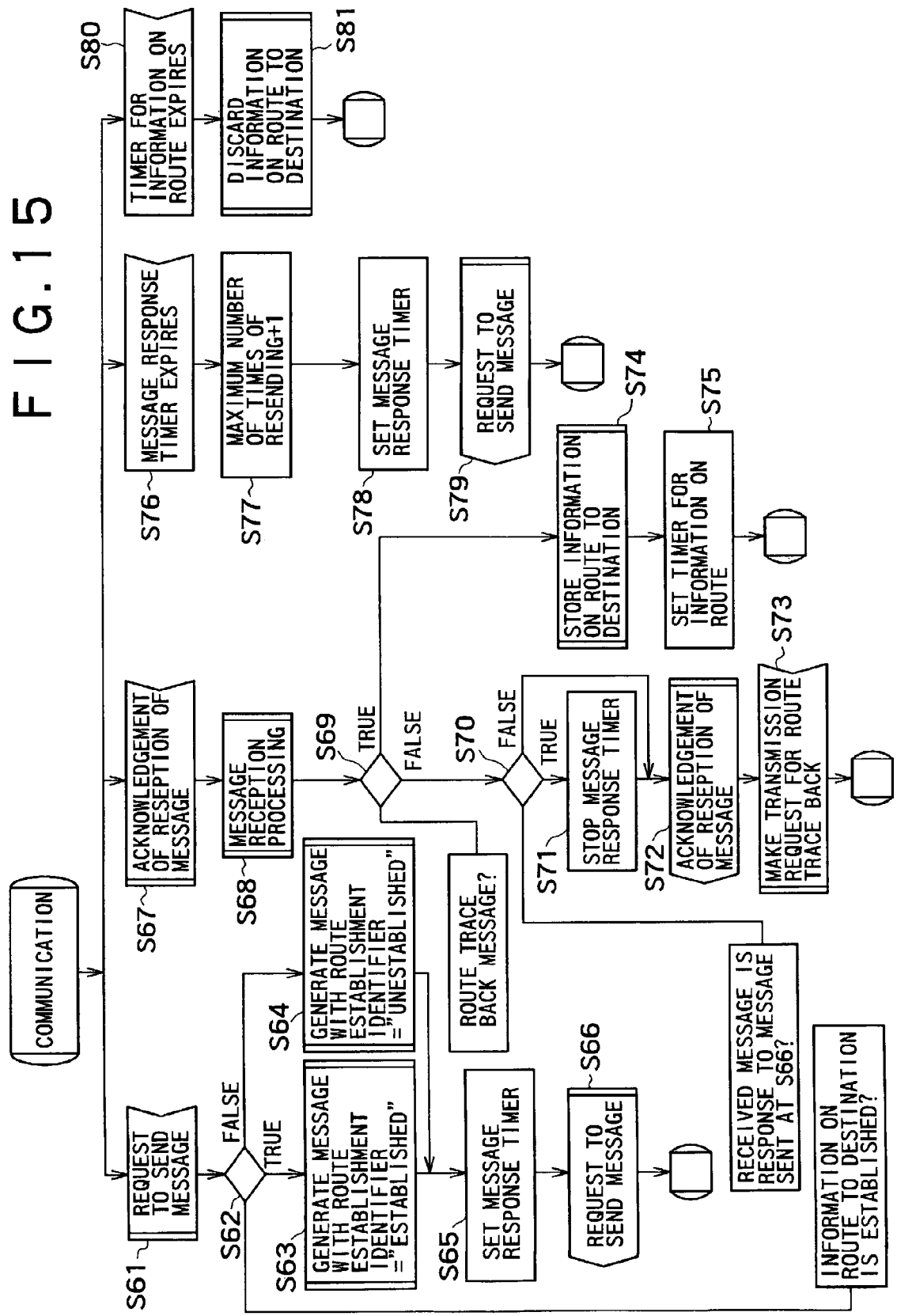
FIG. 15 is a flowchart illustrating the operating procedure for a mobile terminal provided with a route trace back function.

FIG. 15 illustrates the operating procedure for the mobile terminal provided with a function of tracing back routes, in the form of flowchart.

When the mobile terminal makes a request to send a message (Step S61), the mobile terminal judges first whether the information on route to the mobile terminal or fixed network as destination is established (Step S62).

If the information on route to the mobile terminal or fixed network as destination has been established, the mobile terminal generates user data in the format illustrated in FIG. 13B (Step S63). If the information on route has not been established, the mobile terminal generates user data in the format illustrated in FIG. 13A (Step S64).

When the mobile terminal subsequently sends this user data, the mobile terminal sets a timer for waiting for response from the destination (Step S65). Then, the mobile terminal makes a request to send the message, that is, sends user data, to a base station with which the position of the mobile terminal is registered (Step S66), and terminates the entire routine of the processing.

Meanwhile, when the mobile terminal receives an acknowledgement of message reception (Step S67), the mobile terminal performs message reception processing (Step S68), and then checks whether the message is a route trace back message (Step S69).

If the received message is a route trace back message, the mobile terminal stores the information on route to the destination (Step S74) and sets a timer for the period for which the information on route is valid (Step S75), and then terminates the entire routine of the processing.

If the received message is not a route trace back message, the mobile terminal judges whether the received message is a response to the message which the mobile terminal itself sent at Step S66 (Step S70). If the received message is a response to the sent message, the mobile terminal stops the message response timer at this point of time (Step S71). Then, the mobile terminal acknowledges the message reception (Step S72) and further makes a transmission request for route trace back (Step S73), and then terminates the entire routine of the processing.

If the message response timer expires (Step S76), the mobile terminal judges that the message has not arrived at the destination and increases the maximum number of times of resending by one (Step S77). Then, the mobile terminal sets the message response timer again (Step S78) and sends out the same message (Step S79).

If the information on route timer expires (Step S80), the mobile terminal judges that the corresponding information on route has become already obsolete and discards the information on route (Step S81).

FIGS. 14, 15A, and 15B are based on the presumption that radio links are used for inter base station links as illustrated in FIG. 3. However, even if inter base station links are constituted of wired networks, as illustrated in FIG. 4, message delivery using a route trace back function can be naturally implemented as well.

The above-mentioned communicating procedure is an example of the operation of a network consisting of the base stations and the mobile terminals illustrated in FIG. 3. However, the scope of the communication control method of the present invention is not limited to networks operated based on the management of base stations but similarly applicable to communication systems wherein no base station is present and mobile terminals communicate directly with one another (e.g. ad hoc communications).

Figure 16:
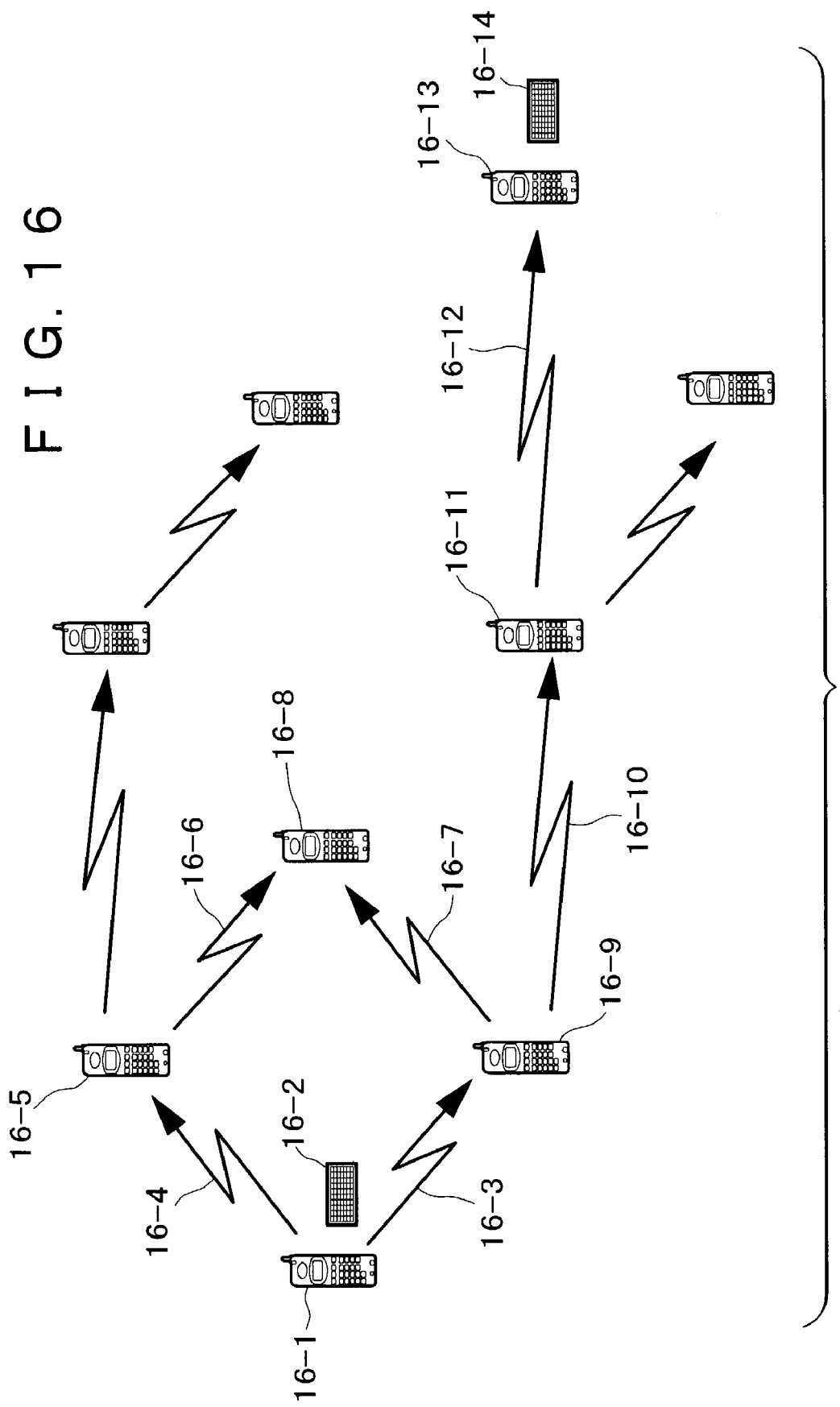
FIG. 16 is a drawing schematically illustrating how a network constituted only of mobile terminals operates.

FIG. 16 schematically illustrates how a network constituted only of mobile terminals operates. In the example shown in this figure, user data 16-2 sent by a mobile terminal 16-1 is delivered to a mobile terminal 16-13 as destination.

The mobile terminal 16-1 sends the user data 16-2 to a mobile terminal 16-9 through a radio link 16-3. When the mobile terminal 16-9 receives the user data, the mobile terminal transfers the data to an adjacent mobile terminal 16-11 using a direct link 16-10 between mobile terminals because the destination of the data is not the mobile terminal 16-9 itself. The user data 16-14 is eventually delivered to the mobile terminal 16-13 as destination by repeating such operation of resending the user data.

With respect to this example, it maybe considered that the base station in the FIG. 3 is given a user interface processing portion (display, keyboard) and a speech processing portion.

Figure 17:
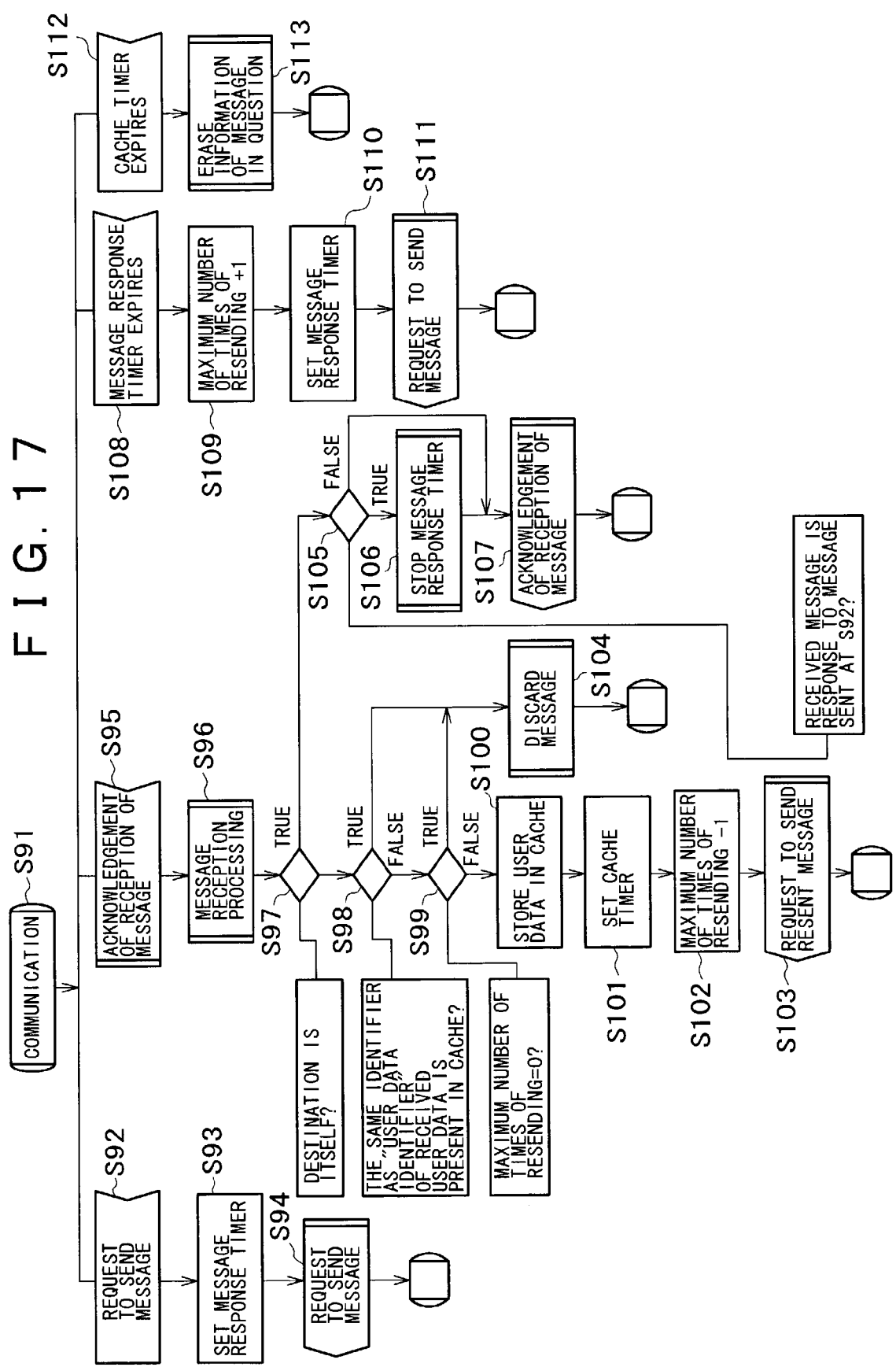
FIG. 17 is a flowchart illustrating the processing procedure performed by each mobile terminal in a radio network wherein mobile terminals communicate directly with one another, as illustrated in FIG. 16.

FIG. 17 illustrates in the form of flowchart the processing procedure performed by each mobile terminal in a radio network where in mobile terminals communicate directly with one another, as illustrated in FIG. 16.

When a message to be sent from a user is generated (Steps S91 and S92), the mobile terminal sets a timer for waiting for response from the mobile terminal on the other end (Step S93) and makes transmission (Step S94).

When the mobile terminal receives a message from an adjacent mobile terminal (Step S95, S96), the mobile terminal judges whether the destination of the message is the mobile terminal itself (Step S97). If the message is not destined for the mobile terminal itself, the mobile terminal stores the user data information in the cache (Step S100) and resends the user message to adjacent mobile terminals.

In the example shown in FIG. 16, such message relaying processing is performed by mobile terminals marked with a reference number of 16-9, 16-11, or the like.

Meanwhile, if the received message is destined for the mobile terminal itself (Step S97), the mobile terminal further judges whether the message is a response to the message which the mobile terminal itself sent (Step S105). If the message is a response to the message which the mobile terminal itself sent, the mobile terminal stops the message response timer at this point of time (Step S106), and then acknowledges the reception of the message to the user (Step S107). If the received message is not a response message but a message destined for the mobile terminal itself, the mobile terminal acknowledges the reception of the message to the user (Step S107).

If the message response timer expires (Step S108), the mobile terminal judges that the message has failed to arrive at the destination, and increases the maximum number of times of resending by one (Step S109) Then, the mobile terminal sets the message response timer again (Step S110) and sends out the same message (Step S111).

If the cache timer expires (Step S112), the mobile terminal erases the mobile terminal message having the timer from the cache (refer to FIG. 10) (Step S113).

Up to this point, the present invention has been described in details referring to the specific embodiments. However, it is obvious that persons skilled in the art can modify or substitute the embodiments of the present invention to the extent that the substance of the present invention is not deviated from. That is, the present invention is disclosed in the form of exemplification, and the contents of the present specification should not be interpreted in a definite fashion. To evaluate the subject matter of the present invention, the section of the scope of claims should be taken into account.

What is claimed is:

1. A communication system capable of receiving data comprising a plurality of base stations and a plurality of mobile terminals, wherein
   each base station is provided with intra cell links for data communication with mobile terminals present inside a cell of the base station itself and inter base station links for data communication with adjacent base stations, and
   in response to received user data destined for a mobile terminal outside of the cell, said user data is transferred to adjacent base stations using said inter base station links,
   said base stations being operable to communicate with each other via wireless broadcast signals and to discontinue communication for a predetermined period of time.

2. Communication control equipment capable of receiving user data that operates as a base station in a communication environment created by deploying cells of a plurality of base stations in a plane, comprising:
   intra cell communicating means for conducting data communication with mobile terminals present inside a cell of the base station itself through intra cell communication links;
   inter base station communicating means for conducting data communication with adjacent base stations through inter base station communication links; and
   data transmission controlling means that, in response to received user data, transfers said user data using one of said intra cell communicating means and said inter base station communicating means, and wherein
   when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means transfers said user data to adjacent base stations using said inter base station links, said base stations being operable to communicate with each other via wireless broadcast signals and to discontinue communication for a predetermined period of time.

3. Communication control equipment capable of receiving user data that operates as a base station in a communication environment created by deploying cells of a plurality of base stations in a plane, comprising:

intra cell communicating means for conducting data communication with mobile terminals present inside a cell of the base station itself through intra cell communication links;

inter base station communicating means for conducting data communication with adjacent base stations through inter base station communication links; and data transmission controlling means that, in response to received user data, transfers said user data using one of said intra cell communicating means and said inter base station communicating means, and wherein when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means transfers said user data to adjacent base stations using said inter base station links, wherein when said data transmission controlling means receives said user data destined for a mobile terminal outside of the cell, said data transmission controlling means transferring said user data to adjacent base stations when a random time has passed after the reception of said user data.

4. Communication control equipment capable of receiving user data that operates as a base station in a communication environment created by deploying cells of a plurality of base stations in a plane, comprising:

intra cell communicating means for conducting data communication with mobile terminals present inside a cell of the base station itself through intra cell communication links;

inter base station communicating means for conducting data communication with adjacent base stations through inter base station communication links; and data transmission controlling means that, in response to received user data, transfers said user data using one of said intra cell communicating means and said inter base station communicating means, and wherein when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means transfers said user data to adjacent base stations using said inter base station links, wherein a user data identifier is added to each user data, and said data transmission controlling means holds said user data identifier included in received user data for a specified time period, and, when said data transmission controlling means receives user data having said user data identifier held, refrains from transferring said user data to adjacent base stations.

5. Communication control equipment capable of receiving user data that operates as a base station in a communication environment created by deploying cells of a plurality of base stations in a plane, comprising:

intra cell communicating means for conducting data communication with mobile terminals present inside a cell of the base station itself through intra cell communication links;

inter base station communicating means for conducting data communication with adjacent base stations through inter base station communication links; and data transmission controlling means that, in response to received user data, transfers said user data using one of said intra cell communicating means and said inter base station communicating means, and wherein when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means transfers said user data to adjacent base stations using said inter base station links, wherein a maximum number of times of transfer is specified for each user data, and said data transmission controlling means refrains from transferring to adjacent base stations user data whose number of times of transfer has reached said maximum number of times of transfer.

6. Communication control equipment capable of receiving user data that operates as a base station in a communication environment created by deploying cells of a plurality of base stations in a plane, comprising:

intra cell communicating means for conducting data communication with mobile terminals present inside a cell of the base station itself through intra cell communication links;

inter base station communicating means for conducting data communication with adjacent base stations through inter base station communication links; and data transmission controlling means that, in response to received user data, transfers said user data using one of said intra cell communicating means and said inter base station communicating means, and wherein when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means transfers said user data to adjacent base stations using said inter base station links, wherein a present number of times of resending is described in resent user data, and said data transmission controlling means limits transfer of user data to adjacent base stations according to said present number of times of resending.

7. Communication control equipment capable of receiving user data that operates as a base station in a communication environment created by deploying cells of a plurality of base stations in a plane, comprising:

intra cell communicating means for conducting data communication with mobile terminals present inside a cell of the base station itself through intra cell communication links;

inter base station communicating means for conducting data communication with adjacent base stations through inter base station communication links; and data transmission controlling means that, in response to received user data, transfers said user data using one of said intra cell communicating means and said inter base station communicating means, and wherein when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means adds a device identifier to said user data and transfers said user data to adjacent base stations using said inter base station links.

8. Communication control equipment capable of receiving user data that operates as a base station in a communication environment created by deploying cells of a plurality of base stations in a plane, comprising:

intra cell communicating means for conducting data communication with mobile terminals present inside a cell of the base station itself through intra cell communication links;

inter base station communicating means for conducting data communication with adjacent base stations through inter base station communication links; and data transmission controlling means that, in response to received user data, transfers said user data using one of said intra cell communicating means and said inter base station communicating means, and wherein when said data transmission controlling means receives user data destined for a mobile terminal inside the cell of the base station itself, said data transmission controlling means sends said user data to the mobile terminal as destined, and, when said data transmission controlling means receives user data destined for a mobile terminal outside of the cell of the base station itself, said data transmission controlling means adds a device identifier to said user data and transfers said user data to adjacent base stations using said inter base station links, wherein user data includes information on a delivery route describing device identifiers of individual devices on said delivery route, and if the device identifier of its own device is not included in the information on delivery route, said data transmission controlling means discards said user data.

9. A communication control method for base stations capable of receiving user data to operate in a communication environment created by deploying cells of a plurality of base stations in a plane, comprising:

an intra cell communicating step in which data communication with mobile terminals present inside a cell of the base station itself is conducted through intra cell communication links;

an inter base station communicating step in which data communication with adjacent base stations is conducted through inter base station communication links; and a data transmission controlling step in which, in response to received user data, transfer of said user data using one of said intra cell communication links and said inter base station communication links is controlled, wherein in said data transmission controlling step, when user data destined for a mobile terminal inside a cell of the base station itself, said user data is sent to said mobile terminal as destined, and, when user data destined for a mobile terminal outside of the cell, said user data is transferred to adjacent base stations using said inter base station links, said base stations being operable to communicate with each other via wireless broadcast signals and to discontinue communication for a predetermined period of time.

10. A communication control method for base stations capable of receiving user data to operate in a communication environment created by deploying cells of a plurality of base stations in a plane, comprising:

an intra cell communicating step in which data communication with mobile terminals present inside a cell of the base station itself is conducted through intra cell communication links;

an inter base station communicating step in which data communication with adjacent base stations is conducted through inter base station communication links; and a data transmission controlling step in which, in response to received user data, transfer of said user data using one of said intra cell communication links and said inter base station communication links is controlled, wherein in said data transmission controlling step, when user data destined for a mobile terminal inside a cell of the base station itself, said user data is sent to said mobile terminal as destined, and, when user data destined for a mobile terminal outside of the cell, said user data is transferred to adjacent base stations using said inter base station links, wherein in said data transmission controlling step, when user data destined for a mobile terminal outside of the cell, transfer of said user data to adjacent base stations is started when a random time has passed after the reception of said user data.

11. A communication control method for base stations capable of receiving user data to operate in a communication environment created by deploying cells of a plurality of base stations in a plane, comprising:

an intra cell communicating step in which data communication with mobile terminals present inside a cell of the base station itself is conducted through intra cell communication links;

an inter base station communicating step in which data communication with adjacent base stations is conducted through inter base station communication links; and a data transmission controlling step in which, in response to received user data, transfer of said user data using one of said intra cell communication links and said inter base station communication links is controlled, wherein in said data transmission controlling step, when user data destined for a mobile terminal inside a cell of the base station itself, said user data is sent to said mobile terminal as destined, and, when user data destined for a mobile terminal outside of the cell, said user data is transferred to adjacent base stations using said inter base station links, wherein a user data identifier is added to each user data, and in said data transmission controlling step, said user data identifier included in received data is held for a specified time period, and, when user data having said user data identifier held is received, said user data is not transferred to adjacent base stations.

12. A communication control method for base stations capable of receiving user data to operate in a communication environment created by deploying cells of a plurality of base stations in a plane, comprising:

an intra cell communicating step in which data communication with mobile terminals present inside a cell of the base station itself is conducted through intra cell communication links;

an inter base station communicating step in which data communication with adjacent base stations is conducted through inter base station communication links; and a data transmission controlling step in which, in response to received user data, transfer of said user data using one of said intra cell communication links and said inter base station communication links is controlled, wherein in said data transmission controlling step, when user data destined for a mobile terminal inside a cell of the base station itself, said user data is sent to said mobile terminal as destined, and, when user data destined for a mobile terminal outside of the cell, said user data is transferred to adjacent base stations using said inter base station links, wherein a maximum number of times of transfer is specified for each user data, and in said data transmission controlling step, user data whose number of times of transfer has reached said maximum number of times of transfer is not transferred to adjacent base stations.

13. A communication control method for base stations capable of receiving user data to operate in a communication environment created by deploying cells of a plurality of base stations in a plane, comprising:

an intra cell communicating step in which data communication with mobile terminals present inside a cell of the base station itself is conducted through intra cell communication links;

an inter base station communicating step in which data communication with adjacent base stations is conducted through inter base station communication links; and a data transmission controlling step in which, in response to received user data, transfer of said user data using one of said intra cell communication links and said inter base station communication links is controlled, wherein in said data transmission controlling step, when user data destined for a mobile terminal inside a cell of the base station itself, said user data is sent to said mobile terminal as destined, and, when user data destined for a mobile terminal outside of the cell, said user data is transferred to adjacent base stations using said inter base station links, wherein a present number of times of resending is described in user data, and in said data transmission controlling step, transfer of user data to adjacent base stations is limited according to said present number of times of resending.

14. A communication control method for base stations capable of receiving user data to operate in a communication environment created by deploying cells of a plurality of base stations in a plane, comprising:

an intra cell communicating step in which data communication with mobile terminals present inside a cell of the base station itself is conducted through intra cell communication links;

an inter base station communicating step in which data communication with adjacent base stations is conducted through inter base station communication links; and a data transmission controlling step in which, in response to received user data, transfer of said user data using one of said intra cell communication links and said inter base station communication links is controlled, wherein in said data transmission controlling step, when user data destined for a mobile terminal inside a cell of the base station itself, said user data is sent to said mobile terminal as destined, and, when user data destined for a mobile terminal outside of the cell, said user data is transferred to adjacent base stations using said inter base station links, wherein in said data transmission controlling step, a device identifier is added to user data before said user data is transferred to adjacent base stations.

15. The communication control method according to claim 10, wherein user data includes information on a delivery route describing device identifiers of devices on said delivery route, and in said data transmission controlling step, if the device identifier of its own device is not included in the information on delivery route, said user data is discarded.

16. Communication apparatus capable of receiving user data which operates in a radio ad hoc network comprising:

communicating means for intercommunicating with other communication terminals; and data transmission controlling means which, in response to received user data, transfers said user data using said communicating means, and wherein when said data transmission controlling means receives user data destined for its own terminal, said data transmission controlling means performs reception processing and, when said data transmission controlling means receives user data not destined for its own terminal, said data transmission controlling means transfers said user data to an adjacent communication terminal using said communicating means, said terminals being operable to communicate with each other via wireless broadcast signals and to discontinue communication for a predetermined period of time.

17. Communication apparatus capable of receiving user data which operates in a radio ad hoc network comprising:

communicating means for intercommunicating with other communication terminals; and data transmission controlling means which, in response to received user data, transfers said user data using said communicating means, and wherein when said data transmission controlling means receives user data destined for its own terminal, said data transmission controlling means performs reception processing and, when said data transmission controlling means receives user data not destined for its own terminal, said data transmission controlling means transfers said user data to an adjacent communication terminal using said communicating means, wherein a maximum number of times of transfer is specified before user data is sent out.

18. The communication apparatus according to claim 17, wherein when an acknowledgement of reception of user data does not come from a party on the other end of communication within a specified time, said maximum number of times of transfer is increased before said user data is resent.

19. The communication apparatus according o claim 17, wherein information on delivery route is acquired from acknowledgement of reception of user data from a party on the other end of communication, and said information on delivery route is added for said party on the other end of communication before a next user data is sent.

20. The communication apparatus according to claim 17, wherein said acquired information on delivery route is discarded after a specified time period has passed.

21. The communication apparatus according to claim 17, wherein in response to reception of user data including information on delivery route, an acknowledgement of reception including information on delivery route is returned.

22. The communication apparatus according to claim 17, wherein a verifying datagram for verifying the validity of information on delivery route is sent at specified time intervals, and, where said datagram is not returned within specified time, said information on delivery route is discarded.

23. A communication method which works in a radio ad hoc network constituted of a plurality of pieces of communication apparatus capable of receiving user data, comprising:

a communicating step for intercommunicating with other communication terminals; and a data transmission controlling step in which, in response to received user data, said user data is transferred through said communicating step, wherein in said data transmission controlling step, when user data destined for a terminal is received, reception processing is performed and, when user data not destined for said terminal is received, user data is transferred to adjacent communication terminal using said communicating means, said terminals being operable to communicate with each other via wireless broadcast signals and to discontinue communication for a predetermined period of time.

24. A communication method which works in a radio ad hoc network constituted of a plurality of pieces of communication apparatus capable of receiving user data, comprising:

a communicating step for intercommunicating with other communication terminals; and a data transmission controlling step in which, in response to received user data, said user data is transferred through said communicating step, wherein in said data transmission controlling step, when user data destined for a terminal is received, reception processing is performed and, when user data not destined for said terminal is received, user data is transferred to adjacent communication terminal using said communicating means, wherein a maximum number of times of transfer is specified before user data is sent out.

25. A communication method which works in a radio ad hoc network constituted of a plurality of pieces of communication apparatus capable of receiving user data, comprising:

a communicating step for intercommunicating with other communication terminals; and a data transmission controlling step in which, in response to received user data, said user data is transferred through said communicating step, wherein in said data transmission controlling step, when user data destined for a terminal is received, reception processing is performed and, when user data not destined for said terminal is received, user data is transferred to adjacent communication terminal using said communicating means, wherein when an acknowledgement of reception of user data does not come from a party on the other end of communication within a specified time, said maximum number of times of transfer is increased before said user data is resent.

26. A communication method which works in a radio ad hoc network constituted of a plurality of pieces of communication apparatus capable of receiving user data, comprising:

a communicating step for intercommunicating with other communication terminals; and a data transmission controlling step in which, in response to received user data, said user data is transferred through said communicating step, wherein in said data transmission controlling step, when user data destined for a terminal is received, reception processing is performed and, when user data not destined for said terminal is received, user data is transferred to adjacent communication terminal using said communicating means, wherein information on delivery route is acquired from an acknowledgement of reception of user data from a party on the other end of communication, and said information on delivery route is added for said party on the other end of communication before a next user data is sent.

27. A communication method which works in a radio ad hoc network constituted of a plurality of pieces of communication apparatus capable of receiving user data, comprising:

a communicating step for intercommunicating with other communication terminals; and a data transmission controlling step in which, in response to received user data, said user data is transferred through said communicating step, wherein in said data transmission controlling step, when user data destined for a terminal is received, reception processing is performed and, when user data not destined for said terminal is received, user data is transferred to adjacent communication terminal using said communicating means, wherein said acquired information on delivery route is discarded when a specified time period has passed.

28. A communication method which works in a radio ad hoc network constituted of a plurality of pieces of communication apparatus capable of receiving user data, comprising:
- a communicating step for intercommunicating with other communication terminals; and
- a data transmission controlling step in which, in response to received user data, said user data is transferred through said communicating step, wherein
- in said data transmission controlling step, when user data destined for a terminal is received, reception processing is performed and, when user data not destined for said terminal is received, user data is transferred to adjacent communication terminal using said communicating means, wherein
- in response to the reception of user data including information on delivery route, an acknowledgement of reception including said information on delivery route is returned.

29. A communication method which works in a radio ad hoc network constituted of a plurality of pieces of communication apparatus capable of receiving user data, comprising:
- a communicating step for intercommunicating with other communication terminals; and
- a data transmission controlling step in which, in response to received user data, said user data is transferred through said communicating step, wherein
- in said data transmission controlling step, when user data destined for a terminal is received, reception processing is performed and, when user data not destined for said terminal is received, user data is transferred to adjacent communication terminal using said communicating means, wherein
- a verifying datagram for verifying the validity of information on delivery route is sent at specified time intervals, and, when a response to the datagram is not returned within specified time, said information on delivery route is discarded.

30. A computer program described in computerreadable form for base stations capable of receiving user data to operate in a communication environment created by deploying cells of a plurality of base stations in a plane, comprising;
- an intra cell communicating step in which data communication with mobile terminals present in a cell of the base station itself is conducted through intra cell communication links;
- an inter base station communicating step in which data communication with adjacent base stations is conducted through inter base station communication links; and
- a data transmission controlling step in which, in response to received user data, transfer of said user data using said intra cell communication links or said inter base station communication links is controlled,
- said base stations being operable to communicate with each other via wireless broadcast signals and to discontinue communication for a predetermined period of time.

* * * * *